US012567955B2

(12) United States Patent (10) Patent No.: US 12,567,955 B2
Kim et al. (45) Date of Patent: Mar. 3, 2026

(54) METHOD AND DEVICE FOR USING AUXILIARY INFORMATION BEING TRANSMITTED FROM FORWARD DIRECTION OF BIDIRECTIONAL QUANTUM KEY DISTRIBUTION PROCEDURE IN COMMUNICATION SYSTEM

(71) Applicant: LG ELECTRONICS INC., Seoul (KR)

(72) Inventors: Jayeong Kim, Seoul (KR); Byoung Hoon Kim, Seoul (KR); Hojae Lee, Seoul (KR); Sangrim Lee, Seoul (KR); Byungkyu Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 18/266,799

(22) PCT Filed: Nov. 12, 2021

(86) PCT No.: PCT/KR2021/016537
§ 371 (c)(1),
(2) Date: Jun. 12, 2023

(87) PCT Pub. No.: WO2022/124606
PCT Pub. Date: Jun. 16, 2022

(65) Prior Publication Data
US 2024/0056293 A1 Feb. 15, 2024

(30) Foreign Application Priority Data
Dec. 10, 2020 (KR) ........................ 10-2020-0172253

(51) Int. Cl.
*H04L 9/08* (2006.01)
*H04W 12/041* (2021.01)

(52) U.S. Cl.
CPC ......... *H04L 9/0852* (2013.01); *H04W 12/041* (2021.01)

(58) Field of Classification Search
CPC ..... H04L 9/0852; H04L 2209/80; H04L 9/08; H04W 12/041; H04B 10/508
See application file for complete search history.

(56) References Cited

U.S. PATENT DOCUMENTS

2010/0239092 A1 9/2010 Kuang
2016/0013937 A1* 1/2016 Choi ...................... H04B 10/70
380/278

(Continued)

FOREIGN PATENT DOCUMENTS

KR 1020140054647 5/2014
KR 101466204 11/2014

(Continued)

OTHER PUBLICATIONS

PCT International Application No. PCT/KR2021/016537, International Search Report dated Feb. 15, 2022, 4 pages.

*Primary Examiner* — Baotran N To
(74) *Attorney, Agent, or Firm* — LEE, HONG, DEGERMAN, KANG & WAIMEY

(57) ABSTRACT

A communication system supporting quantum key distribution is disclosed. A method performed by a first device comprises transmitting or receiving a random access (RA) preamble to or from a second device, receiving or transmitting a random access response (RAR) message from or to the second device as a response to the RA preamble, performing a radio resource control (RRC) connection procedure with the second device, generating a sift key for communication with the second device and performing communication through a radio channel with the second device using the sift key.

20 Claims, 24 Drawing Sheets

(56)     References Cited

U.S. PATENT DOCUMENTS

| | | | | |
|---|---|---|---|---|
| 2016/0191471 A1* | 6/2016 | Ryoo | .................... | H04L 63/062 |
| | | | | 455/411 |
| 2016/0352358 A1* | 12/2016 | Ordentlich | ........ | H03M 13/2921 |
| 2018/0183767 A1* | 6/2018 | Ryoo | .................. | H04L 63/0428 |
| 2019/0089682 A1* | 3/2019 | Ryoo | .................... | H04L 63/062 |
| 2019/0386965 A1* | 12/2019 | Ryoo | .................... | H04W 12/04 |
| 2020/0076774 A1* | 3/2020 | Ryoo | .................... | H04W 12/02 |
| 2020/0195620 A1* | 6/2020 | Ryoo | .................... | H04W 12/04 |

FOREIGN PATENT DOCUMENTS

| | | |
|---|---|---|
| KR | 101479117 | 1/2015 |
| KR | 102078866 | 2/2020 |

* cited by examiner

Device(300)

| Communication unit(310)<br>(e.g.,5G Communication unit) | Control unit(320)<br>(e.g.,processor(s)) |
|---|---|
| Communication circuit(312)<br>(e.g.,processor(s),Memory(s)) | Memory unit(330)<br>(e.g.,RAM,storage) |
| Transceiver(s)(314)<br>(e.g.,RF unit(s),antenna(s)) | Additional components(340)<br>(e.g.,power unit/battery, I/O unit,<br>driving unit, computing unit) |

METHOD AND DEVICE FOR USING AUXILIARY INFORMATION BEING TRANSMITTED FROM FORWARD DIRECTION OF BIDIRECTIONAL QUANTUM KEY DISTRIBUTION PROCEDURE IN COMMUNICATION SYSTEM

CROSS-REFERENCE TO RELATED APPLICATION(S)

This application is the National Stage filing under 35 U.S.C. 371 of International Application No. PCT/KR2021/016537, filed on Nov. 12, 2021, which claims the benefit of earlier filing date and right of priority to Korean Application No. 10-2020-0172253, filed on Dec. 10, 2020, the contents of which are all incorporated by reference herein in their entirety.

TECHNICAL FIELD

The following description relates to a communication system supporting quantum key distribution (QKD) and, more particularly, to a method and device for using assistance information transferred in a forward direction of a bi-directional quantum key distribution (QKD) procedure.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a device and method for improving efficiency of bi-directional quantum key distribution (QKD) in a communication system.

The present disclosure may provide a device and method for improving use efficiency of a quantum channel for bi-directional quantum key distribution (QKD) in a communication system.

The present disclosure may provide a device and method for transmitting additional information in forward transmission of bi-directional quantum key distribution (QKD) in a communication system.

The present disclosure may provide a device and method for providing unencrypted information during bi-directional quantum key distribution (QKD) in a communication system.

The present disclosure may provide a device and method for providing enhancing security of bi-directional quantum key distribution (QKD) in a communication system.

The technical objects to be achieved in the present disclosure are not limited to the above-mentioned technical objects, and other technical objects that are not mentioned may be considered by those skilled in the art through the embodiments described below.

Technical Solution

As an example of the present disclosure, a method performed by a first device in a communication system comprises transmitting or receiving a random access (RA) preamble to or from a second device, receiving or transmitting a random access response (RAR) message from or to the second device as a response to the RA preamble, performing a radio resource control (RRC) connection procedure with the second device, generating a secret key for communication with the second device and performing communication through a radio channel with the second device using the secret key. Here, the generating the secret key may comprise receiving at least one forward pulse including at least assistance bit through a quantum channel, transmitting reverse pulses including at least one bit for generating the secret key based on the at least one assistance bit and determining the secret key based on the reverse pulses.

As an example of the present disclosure, a method performed by a second device in a communication system may comprise receiving or transmitting a random access (RA) preamble from or to a first device, transmitting or receiving a random access response (RAR) message to or from the first device as a response to the RA preamble, performing a radio resource control (RRC) connection procedure with the first device, generating a sift key for communication with the first device and performing communication through a radio channel with the first device using the sift key. Here, the generating the sift key may comprise transmitting at least one forward pulse including at least assistance bit through a quantum channel, receiving reverse pulses generated based on the at least one assistance bit and including at least one bit for generating the sift key and determining the sift key based on the reverse pulses.

As an example of the present disclosure, a first device in a communication system may comprise a transceiver and a processor coupled to the transceiver. The processor may transmit or receive a random access (RA) preamble to or from a second device, receive or transmit a random access response (RAR) message from or to the second device as a response to the RA preamble, perform a radio resource control (RRC) connection procedure with the second device, generate a sift key for communication with the second device and perform communication through a radio channel with the second device using the sift key. In order to generate the sift key, the processor may receive at least one forward pulse including at least assistance bit through a quantum channel, transmit reverse pulses including at least one bit for generating the sift key based on the at least one assistance bit and determine the sift key based on the reverse pulses.

As an example of the present disclosure, a second device in a communication system may a transceiver and a processor coupled to the transceiver. The processor may receive or transmit a random access (RA) preamble from or to a first device, transmit or receive a random access response (RAR) message to or from the first device as a response to the RA preamble, perform a radio resource control (RRC) connection procedure with the first device, generate a sift key for communication with the first device and perform communication through a radio channel with the first device using the sift key. In order to generate the sift key, the processor may transmit at least one forward pulse including at least assistance bit through a quantum channel, receive reverse pulses generated based on the at least one assistance bit and including at least one bit for generating the sift key and determine the sift key based on the reverse pulses.

As an example of the present disclosure, a device may comprise at least one processor and at least one computer memory coupled to the at least one processor and configured to store instructions instructing operations as executed by the at least one processor. The operations may comprise the device transmitting or receiving a random access (RA) preamble to or from another device, receiving or transmitting a random access response (RAR) message from or to the other device as a response to the RA preamble, performing a radio resource control (RRC) connection procedure with the other device, generating a sift key for communication with the other device and performing communication through a radio channel with the other device using the sift key. The generating the sift key may comprise receiving at least one forward pulse including at least assistance bit through a quantum channel, transmitting reverse pulses including at least one bit for generating the sift key based on the at least one assistance bit and determining the sift key based on the reverse pulses.

As an example of the present disclosure, a non-transitory computer-readable medium storing at least one instruction may comprise the at least one instruction executable by a processor. The at least one instruction may control the device to transmit or receive a random access (RA) preamble to or from another device, receive or transmit a random access response (RAR) message from or to the other device as a response to the RA preamble, perform a radio resource control (RRC) connection procedure with the other device, generate a sift key for communication with the other device and perform communication through a radio channel with the other device using the sift key. The at least one instruction may control the device to receive at least one forward pulse including at least assistance bit through a quantum channel, transmit reverse pulses including at least one bit for generating the sift key based on the at least one assistance bit and determine the sift key based on the reverse pulses, in order to generate the sift key.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, it is possible to improve resource efficiency of bi-directional quantum key distribution (QKD).

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute anew embodiment. Reference numerals in each drawing may refer to structural elements.

DETAILED DESCRIPTION

Figure 1:
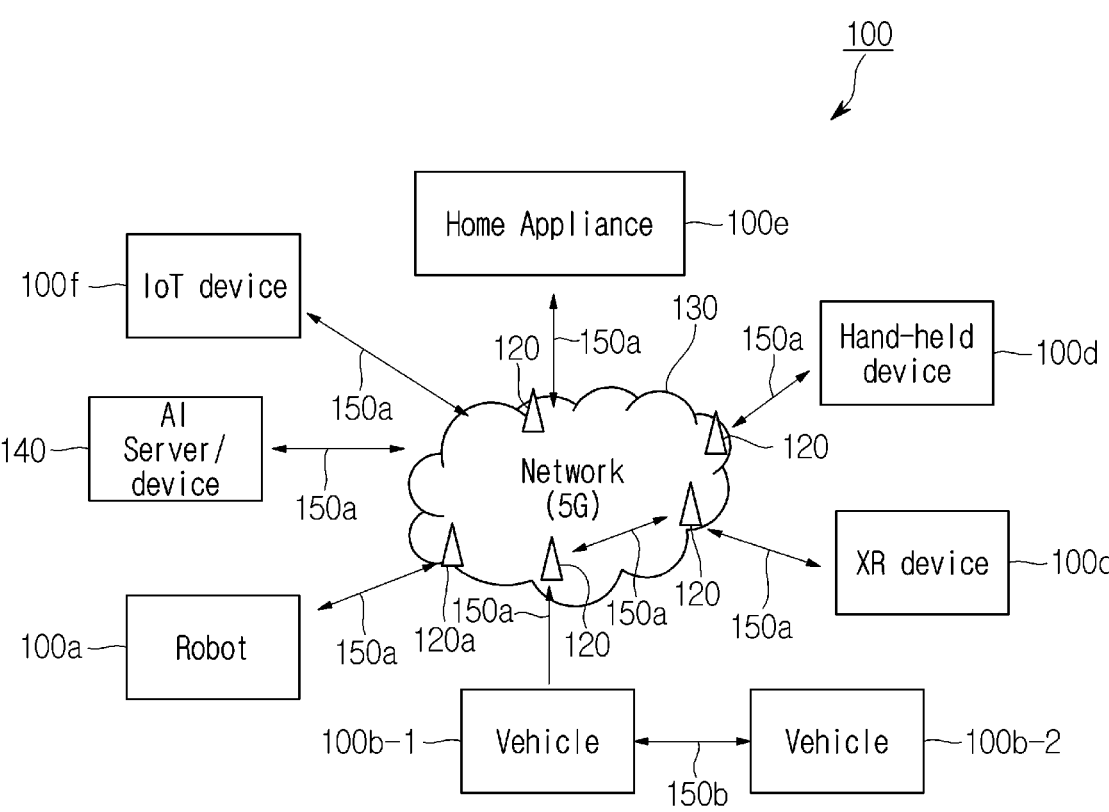
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, 3GPP $5^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
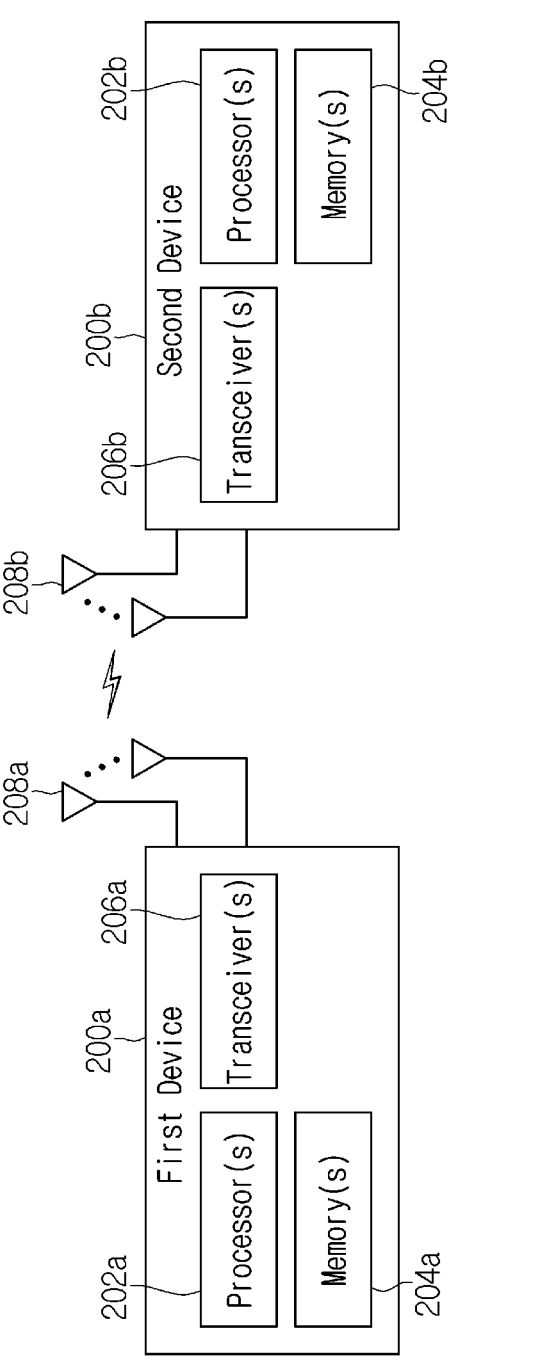
FIG. 2 illustrates an example of a wireless apparatus applicable to the present disclosure.

FIG. 2 illustrates an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be coupled with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be coupled with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be coupled with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
FIG. 3 illustrates another example of a wireless device applicable to the present disclosure.

FIG. 3 illustrates another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
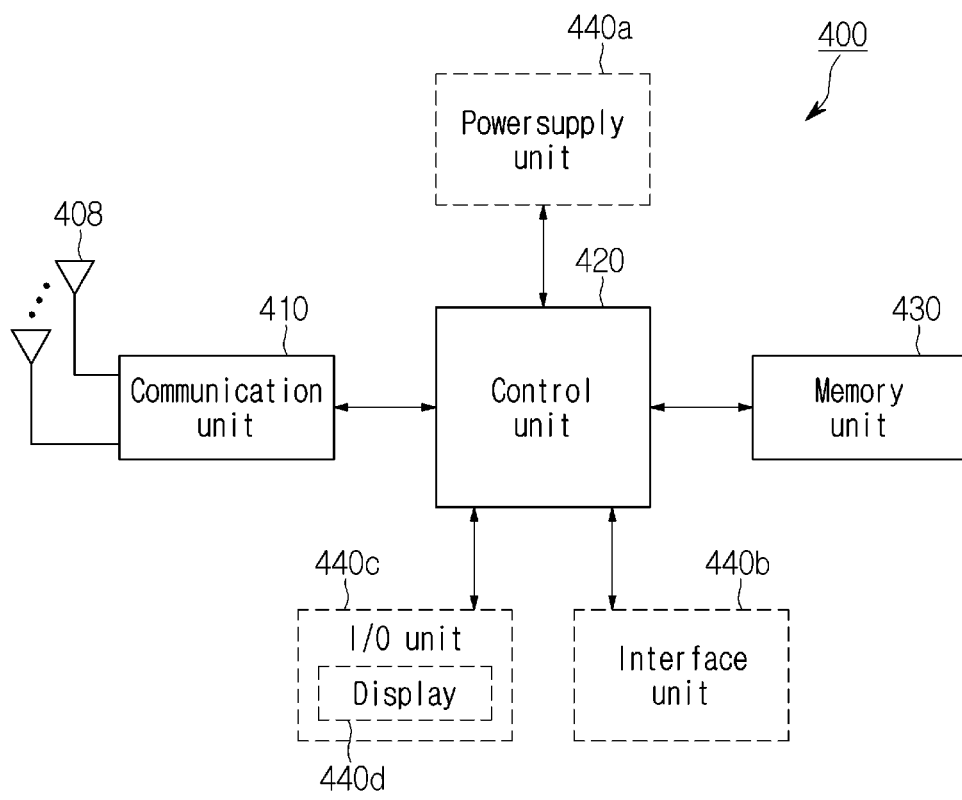
FIG. 4 illustrates an example of a hand-held device applicable to the present disclosure.

FIG. 4 illustrates an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
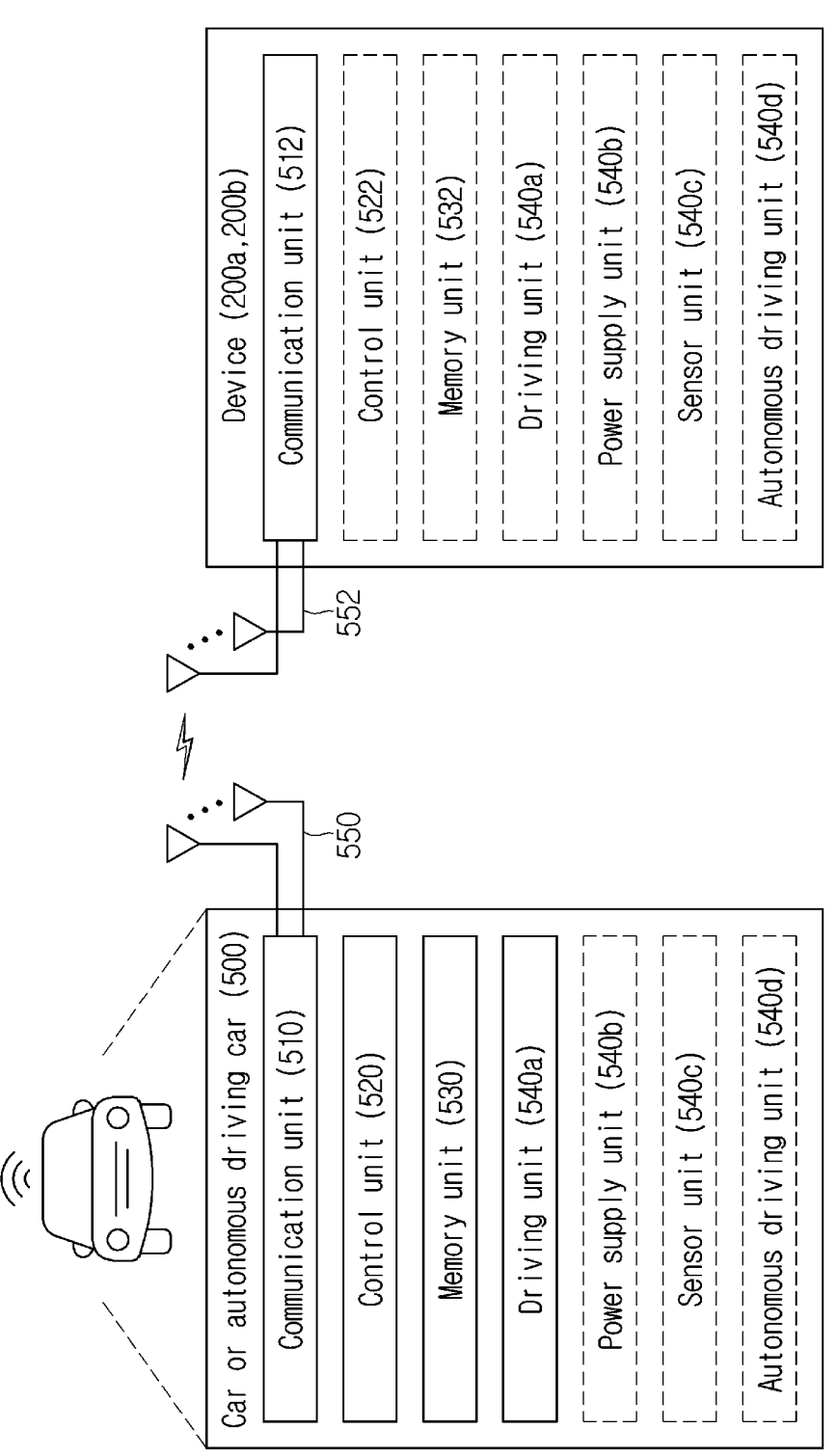
FIG. 5 illustrates an example of a car or an autonomous driving car applicable to the present disclosure.

FIG. 5 illustrates an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
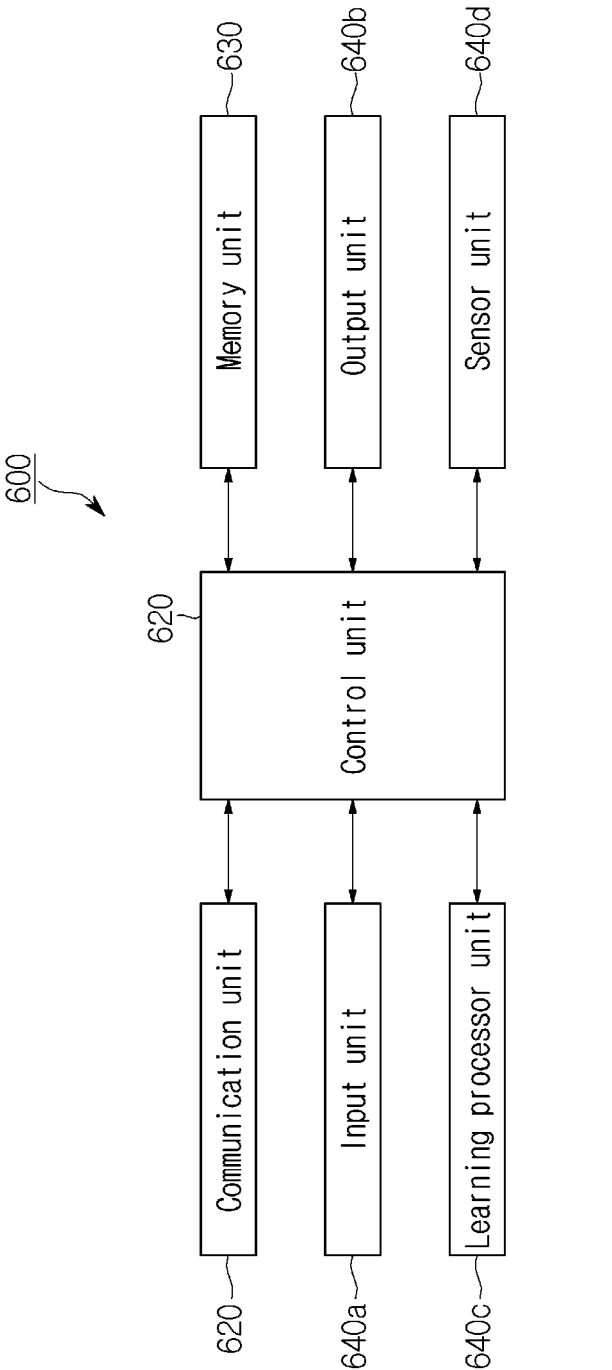
FIG. 6 illustrates an example of artificial intelligence (AI) device applicable to the present disclosure.

FIG. 6 illustrates an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640a/640b, a leaning processor unit (learning processor) 640c and a sensor unit 640d. The blocks 610 to 630/640a to 640d may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640c or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640c or transmit the history information to the AI server (FIG. 1, 140). The collected history information may be used to update a learning model.

The memory unit 630 may store data supporting various functions of the AI device 600. For example, the memory unit 630 may store data obtained from the input unit 640a, data obtained from the communication unit 610, output data of the learning processor unit 640c, and data obtained from the sensing unit 640. In addition, the memory unit 630 may store control information and/or software code necessary to operate/execute the control unit 620.

The input unit 640a may acquire various types of data from the outside of the AI device 600. For example, the input unit 640a may acquire learning data for model learning, input data, to which the learning model will be applied, etc. The input unit 640a may include a camera, a microphone and/or a user input unit. The output unit 640b may generate video, audio or tactile output. The output unit 640b may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640c may train a model composed of an artificial neural network using training data. The learning processor unit 640c may perform AI processing along with the learning processor unit of the AI server (FIG. 1, 140). The learning processor unit 640c may process information received from an external device through the communication unit 610 and/or information stored in the memory unit 630. In addition, the output value of the learning processor unit 640c may be transmitted to the external device through the communication unit 610 and/or stored in the memory unit 630.

Figure 7:
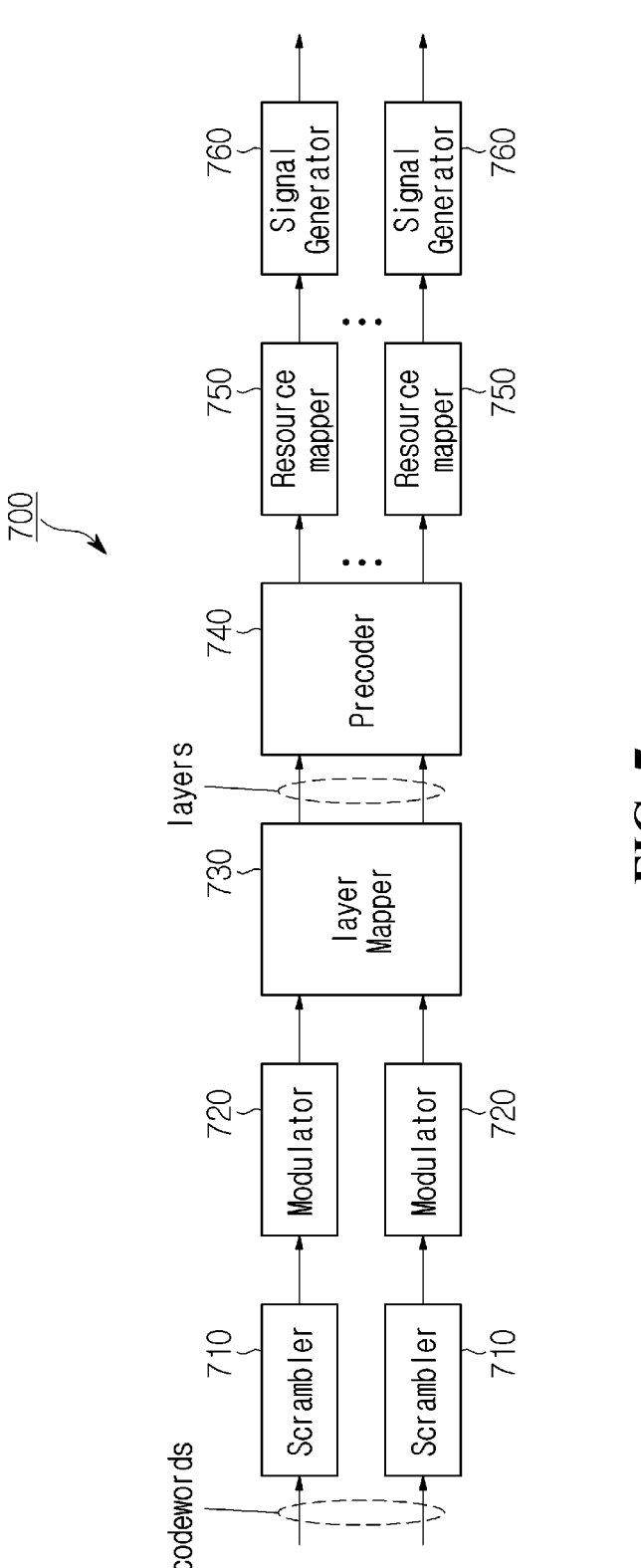
FIG. 7 illustrates physical channels applicable to the present disclosure and a signal transmission method using the same.

FIG. 7 illustrates a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202a and 202b and/or the transceiver 206a and 206b of FIG. 2. In addition, for example, the hardware element of FIG. 7 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 710 to 750 may be implemented in the processors 202a and 202b of FIG. 2 and a block 760 may be implemented in the transceivers 206a and 206b of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output $z$ of the precoder 740 may be obtained by multiplying the output $y$ of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| Per device peak data rate | 1 Tbps |
|---|---|
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 8:
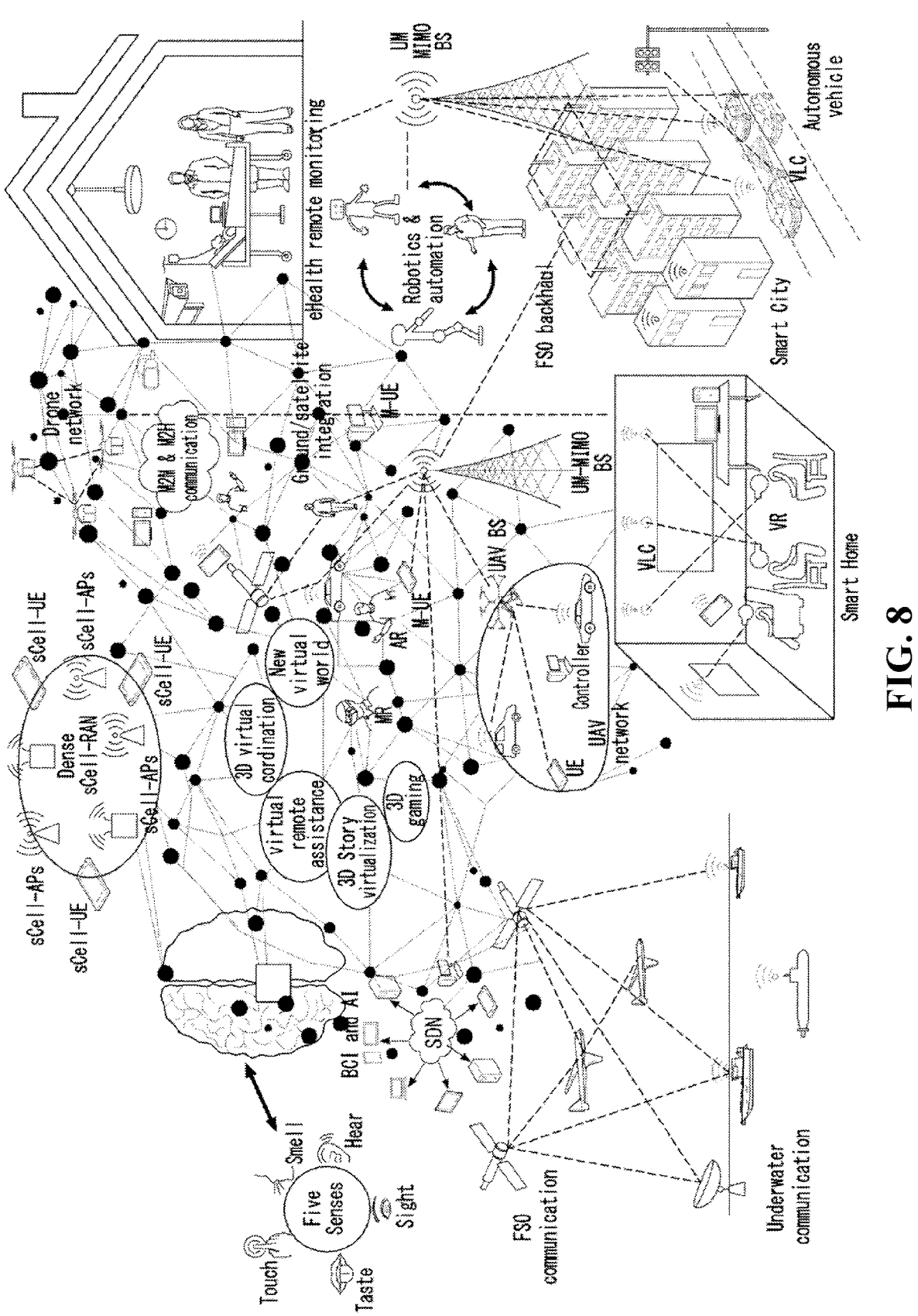
FIG. 8 illustrates an example of a communication structure providable in a 6th generation (6G) system applicable to the present disclosure.

FIG. 8 illustrates an example of a communication structure providable in a 6G system applicable to the present disclosure.

Referring to FIG. 8, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Figure 9:
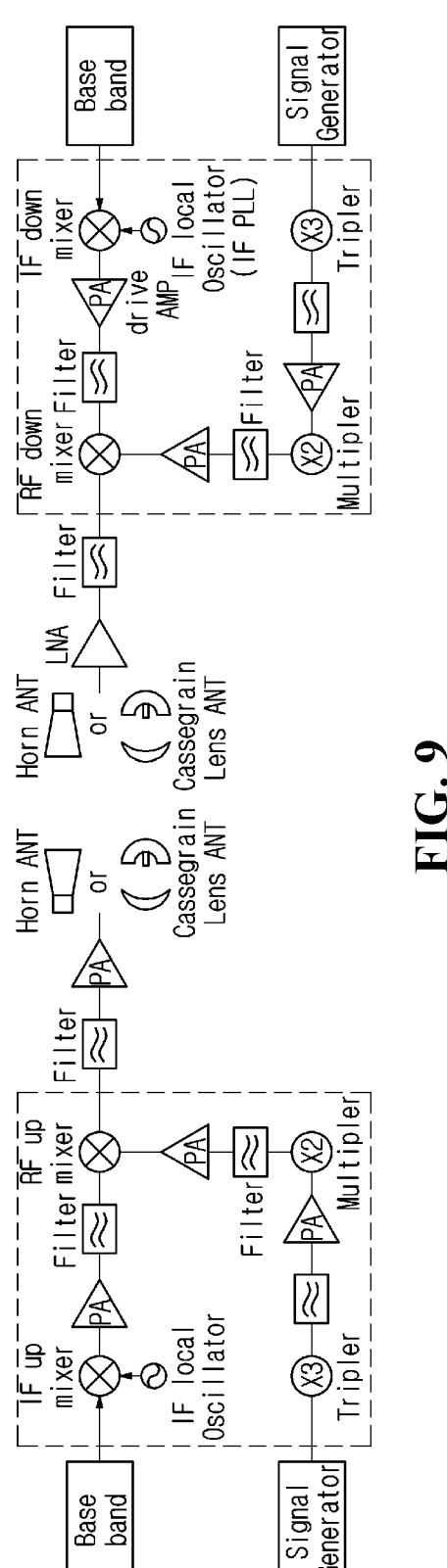
FIG. 9 illustrates a THz wireless communication transceiver applicable to the present disclosure.

FIG. 9 illustrates a THz wireless communication transceiver applicable to the present disclosure.

Referring to FIG. 9, THz wireless communication may be classified based on the method of generating and receiving THz. The THz generation method may be classified as an optical component or electronic component based technology.

At this time, the method of generating THz using an electronic component includes a method using a semiconductor component such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 9, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 9. In FIG. 9, IF represents an intermediate frequency, a tripler and a multiplier represents a multiplier, PA represents a power amplifier, and LNA represents a low noise amplifier, and PLL represents a phase-locked loop.

Figure 19:
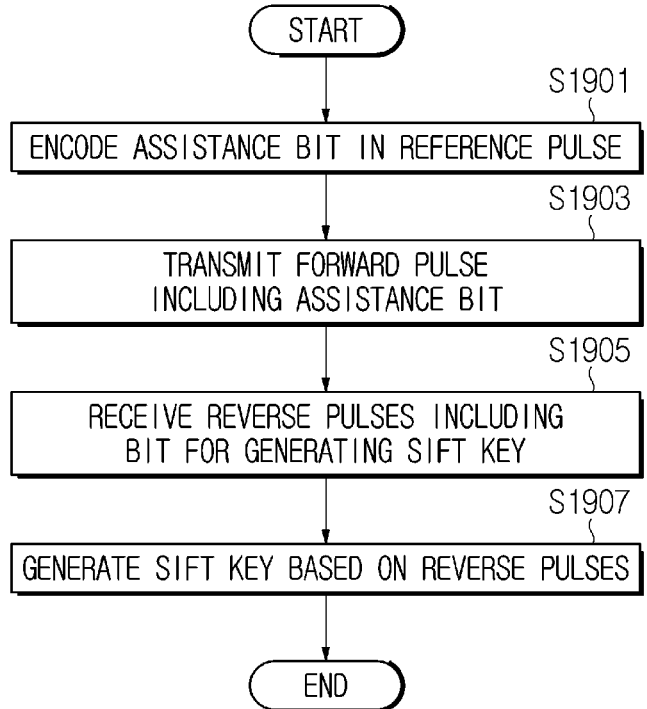
FIG. 19 illustrates an example of a procedure for transmitting assistance information and generating a sift key in a communication system according to an embodiment of the present disclosure.
Figure 20:
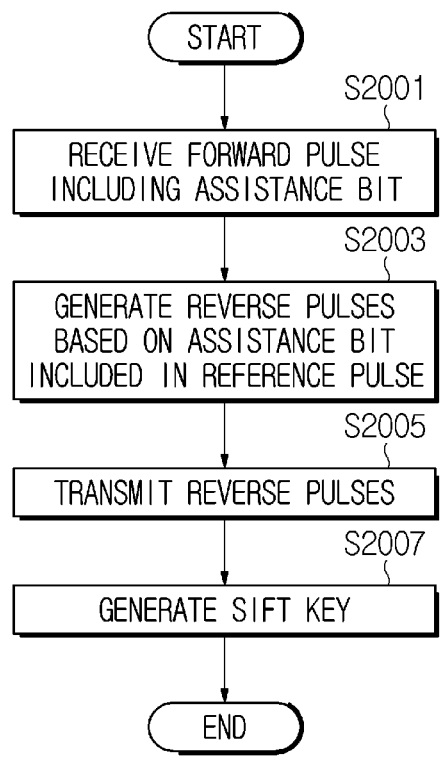
FIG. 20 illustrates an example of a procedure for receiving assistance information and generating a sift key in a communication system according to an embodiment of the present disclosure.

FIG. 19 illustrates a THz signal generation method applicable to the present disclosure. FIG. 20 illustrates a wireless communication transceiver applicable to the present disclosure.

Figure 10:
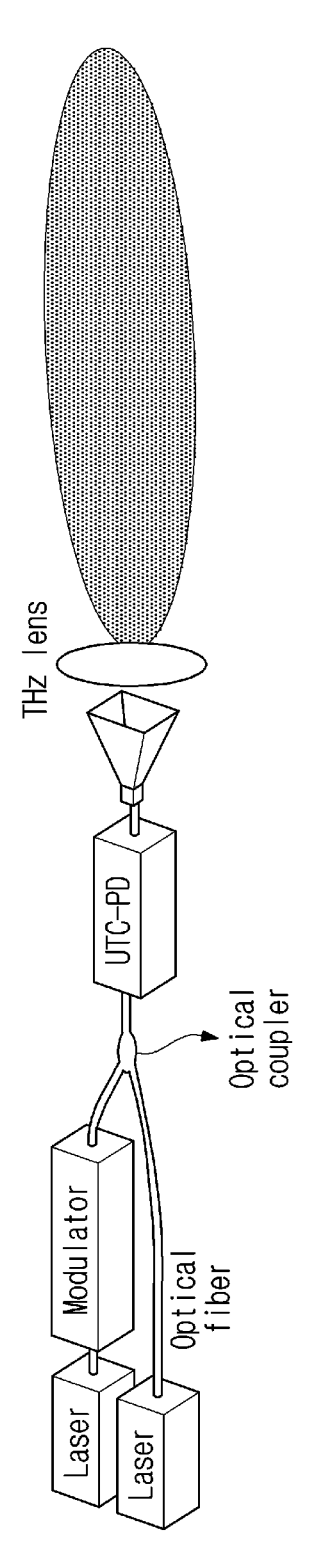
FIG. 10 illustrates a THz signal generation method applicable to the present disclosure.
Figures 11, 12:
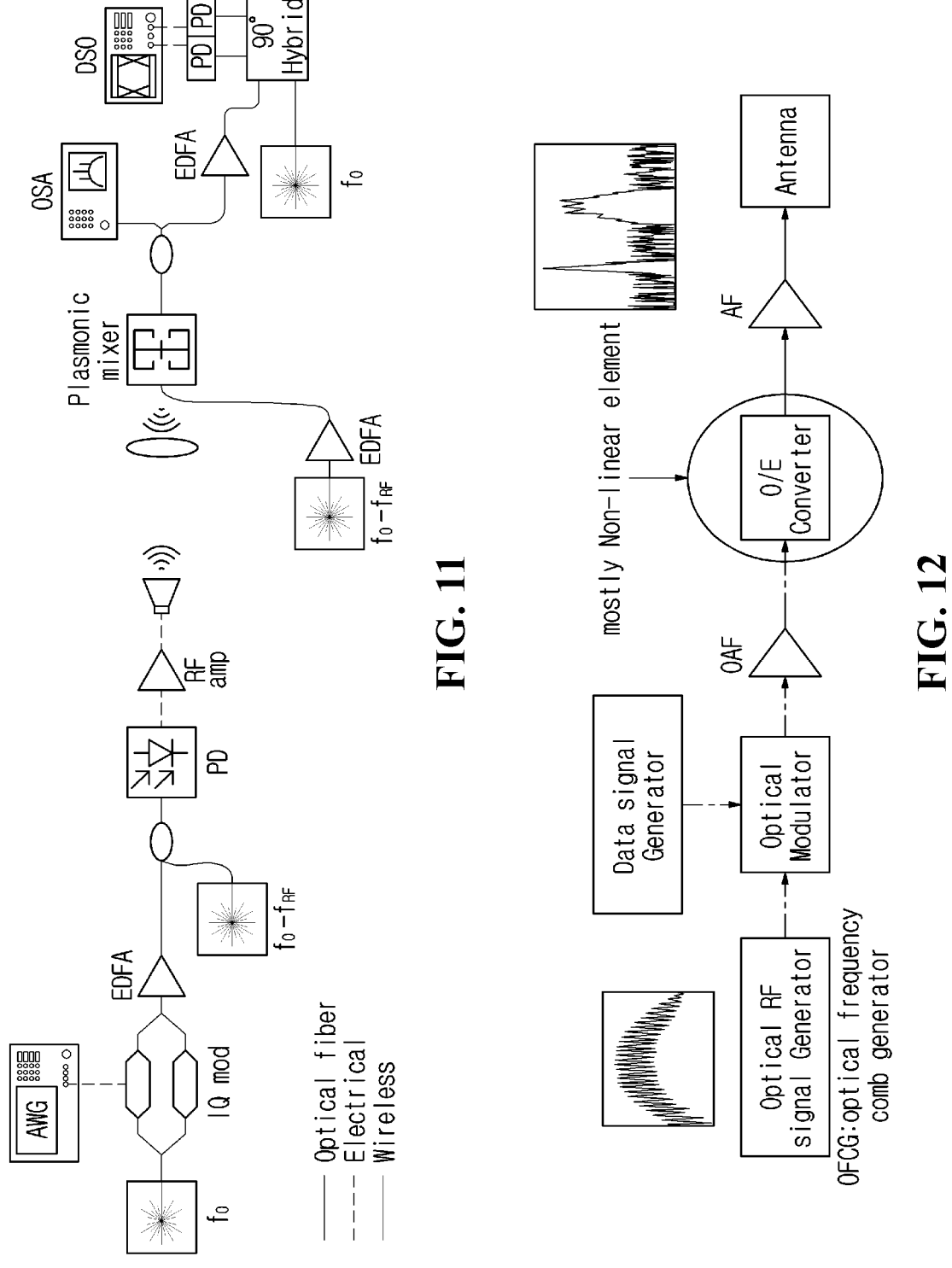
FIG. 11 illustrates a wireless communication transceiver applicable to the present disclosure.
FIG. 12 illustrates a THz signal generation method applicable to the present disclosure.

Referring to FIGS. 10 and 11, the optical component-based THz wireless communication technology means a method of generating and modulating a THz signal using an optical component. The optical component-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic component, can generate a high-power signal, and can obtain a flat response characteristic in a wide frequency band. In order to generate the THz signal based on the optical component, as shown in FIG. 10, a laser diode, a broadband optical modulator, and an ultrahigh-speed photodetector are required. In the case of FIG. 10, the light signals of two lasers having different wavelengths are combined to generate a THz signal corresponding to a wavelength difference between the lasers. In FIG. 10, an optical coupler refers to a semiconductor component that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 11, an erbium-doped fiber amplifier (EDFA) represents an optical fiber amplifier to which erbium is added, a photo detector (PD) represents a semiconductor component capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 13:
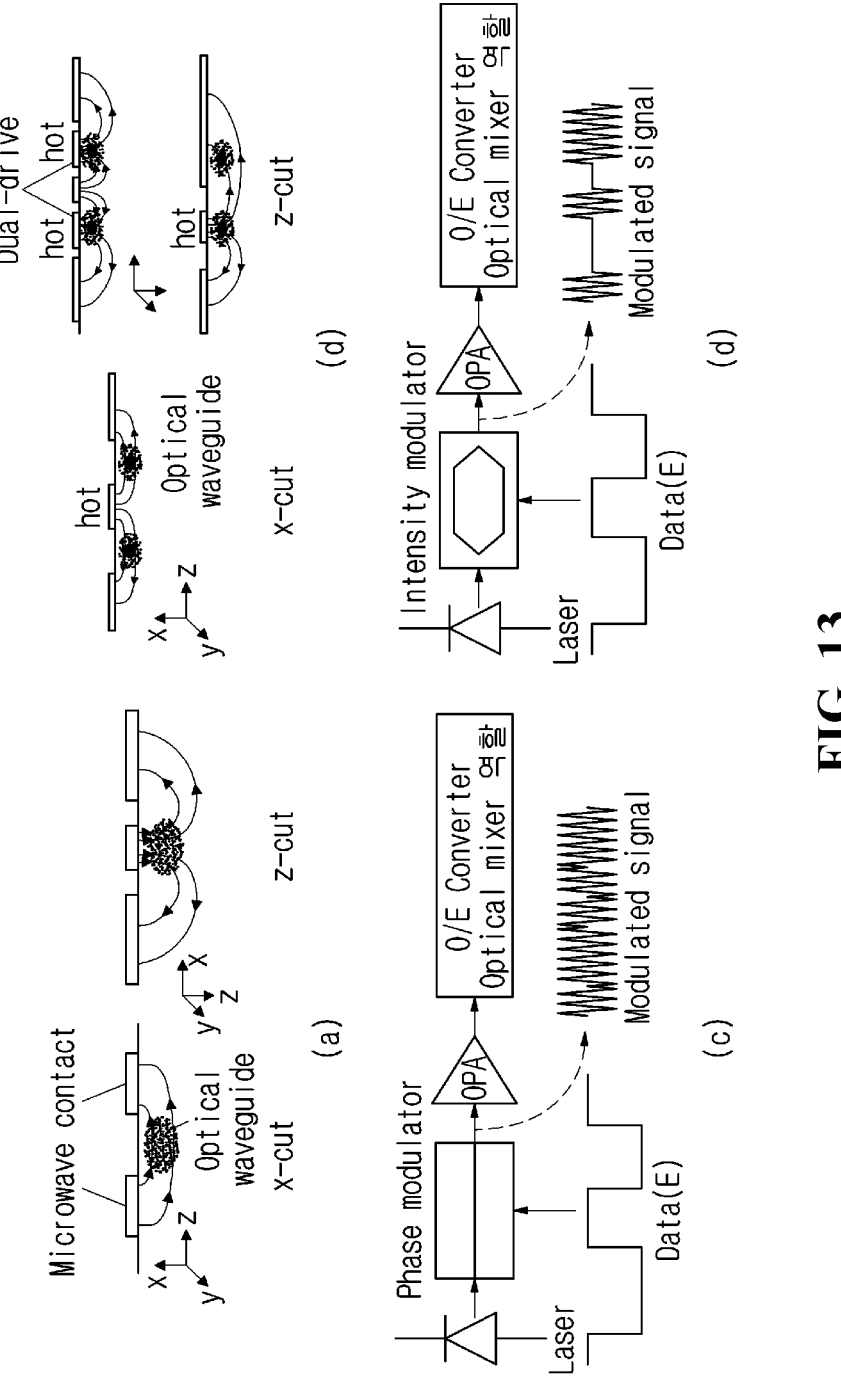
FIG. 13 illustrates a wireless communication transceiver applicable to the present disclosure.

FIG. 12 illustrates a transmitter structure applicable to the present disclosure. FIG. 13 illustrates a modulator structure applicable to the present disclosure.

Referring to FIGS. 12 and 13, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the component.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Quantum Cryptography Communication

In a quantum cryptography communication system, a signal is carried using a single photon, which is a minimum unit of light, unlike conventional communication methods that communicate by wavelength or amplitude. While stability of conventional cryptography systems is mostly guaranteed by complexity of mathematical algorithms, stability of quantum cryptography communication is based on the unique properties of a quantum and thus stability is guaranteed unless the physical laws of quantum mechanics are broken.

The most representative quantum key distribution protocol is the BB84 protocol proposed by C. H. Bennett and G. Brassard in 1984. In the BB84 protocol, information is carried in states such as polarization and phase of photons, and sift keys are shared absolutely safely in theory using the properties of the quantum. [Table 2] below shows an example of the BB84 protocol that generates the sift key by carrying information in a polarization state between Alice at a transmission side and Bob at a reception side. The overall flow of the BB84 protocol is as follows.

(1) Alice randomly generates bits.

(2) Alice randomly selects a transmission polarizer to determine in which polarization bit information is carried.

(3) Alice generates a polarization signal corresponding to the bits randomly generated in (1) and the polarizer randomly selected in (2) and transmits it through a quantum channel.

(4) Bob randomly selects a measurement polarizer to measure the polarization signal transmitted by Alice.

(5) Bob measures and stores the polarization signal transmitted by Alice with the selected polarizer.

(6) Alice and Bob share which polarizer is used through the classical channel.

(7) Alice and Bob obtain a sift key by storing only bits with the same polarizer and removing bits with different polarizers.

TABLE 2

| | Bits generated by Alice | | | | | | | |
|---|---|---|---|---|---|---|---|---|
| | 0 | 1 | 1 | 0 | 1 | 0 | 0 | 1 |
| Transmission polarizer selected by Alice | + | + | × | + | × | × | × | + |
| Polarization signal transmitted by Alice | ↑ | → | ↘ | ↑ | ↘ | ↗ | ↗ | → |
| Measurement signal measured by Bob | + | × | × | × | + | × | + | × |
| Polarization signal measured by Bob | ↑ | ↗ | ↘ | ↗ | → | ↗ | → | → |
| Verification of whether transmission polarizer and measurement polarizer match | Data exchange through classical channel | | | | | | | |
| Finally generated sift key | 0 | 1 | | | 0 | | | 1 |

Figure 14:
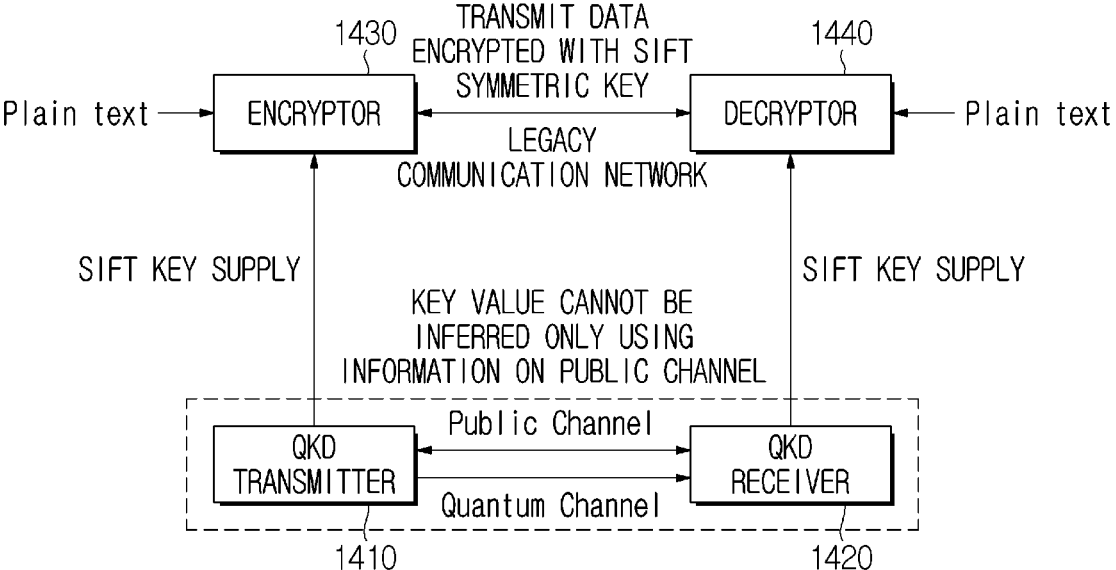
FIG. 14 illustrates a structure of a quantum cryptography communication system applicable to the present disclosure.

FIG. 14 illustrates a structure of a quantum cryptography communication system applicable to the present disclosure. Referring to FIG. 14, a quantum key distribution (QKD) transmitter 1410 may perform communication by being connected to a QKD receiver 1420 through a public channel and a quantum channel. At this time, the QKD transmitter 1410 may supply a sift key to an encryptor 1430, and the QKD receiver 1420 may also supply the sift key to a decryptor 1440. Here, plain text may be input/output to the encryptor 1430, and the encryptor 1430 may transmit data encrypted with a sift symmetric key (through a legacy communication network) to the decryptor 1440. In addition, plain text may be input/output to the decryptor 1440.

Although this BB84 protocol guarantees absolute security in theory, defects may occur in actual hardware implementation. For example, polarization distortion may occur due to birefringence of an optical fiber. Here, birefringence refers to a phenomenon in which a polarization component perpendicular to an optical axis of a medium and a polarization component horizontal to the optical axis of the medium experience different time delays when light passes through a non-isotropic medium. Different time delay due to bire-fringence cause a phase difference between the two compo-nents, and a phase difference between the two components causes a polarization deviation. In order to solve this polar-ization deviation, a plug and play (PnP) quantum key distribution method has been proposed.

Figure 15:
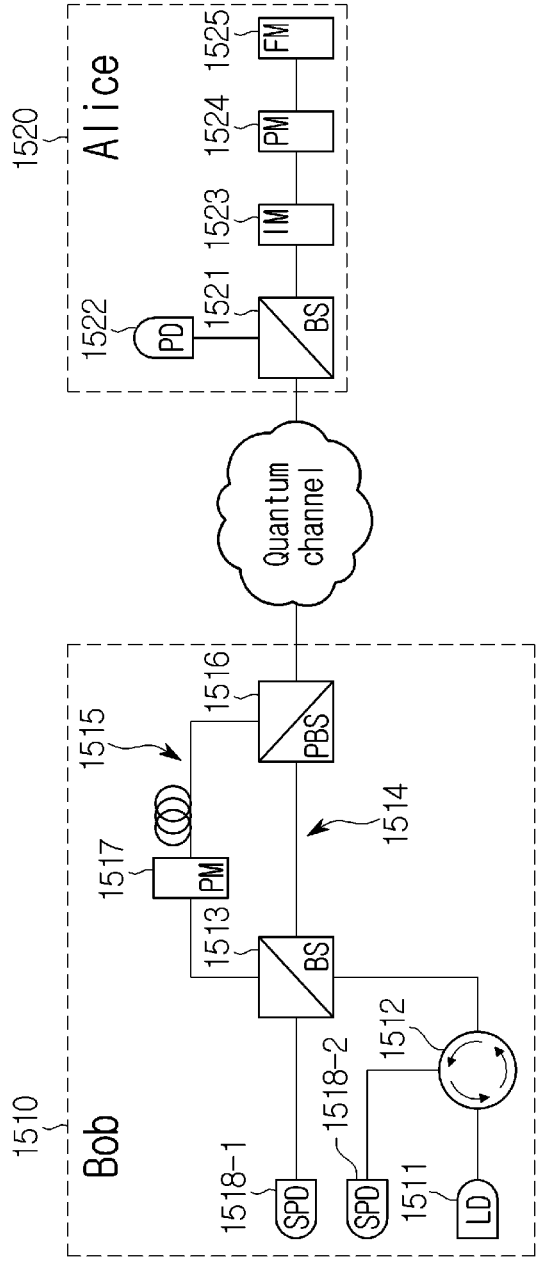
FIG. 15 illustrates a structure of a plug and play (PnP) quantum key distribution system applicable to the present disclosure.

The PnP quantum key distribution method has an advan-tage of automatically compensating for polarization devia-tion due to birefringence during transmission. A general quantum key distribution system follows a one-way method in which Alice, the transmission side, transmits information carried in a quantum state, and Bob, the reception side, measures the quantum state and generates a sift key. On the other hand, the PnP quantum key distribution method fol-lows a two-way method in which, when Bob generates and transmits a reference pulse, Alice receives the reference pulse, carries bit information in a phase state, and returns the pulse with bit information to Bob. FIG. 15 illustrates a structure of a plug and play (PnP) quantum key distribution system applicable to the present disclosure. The overall flow of the BB84 protocol implemented through the PnP quantum key distribution system will be described with reference to FIG. 15 as follows.

First, Bob 1510 generates a reference pulse in the fol-lowing order and transmits it to Alice. Bob 1510 generates a pulse using a laser diode (LD) 1511. The generated pulse is output to a beam splitter (BS) 1513 through a circulator 1512. Bob 1510 splits the generated pulse into two pulses a and b using the beam splitter 1513. Among the split pulses, the pulse a passes through a short path 1514, and polarized light is rotated by 90° by a polarization controller (not shown) included in the short path. The pulse b passes through a long path 1516 and is time-delayed. Since the pulse a and the pulse b have polarized lights orthogonal to each other, they are output to a quantum channel through the same port of a polarization beam splitter (PBS) 1516.

Subsequently, Alice 1520 carries the bit information in the phase of the reference pulse sent by Bob in the following order and transmits it to Bob 1510. The received pulses a and b are split by a beam splitter 1521, and some of them are input to an optical sensor (e.g., a photo diode (PD) 1522. Alice 1520 analyzes the timing and intensity of the received pulse using an optical sensor, generates a trigger signal for synchronizing the clocks of Alice 1520 and Bob 1510, and controls a variable attenuator such that the variable attenu-ator (VA) (e.g., an intensity modulator (IM) 1523) attenuates the pulse to a single photon level. Based on the synchronized clock, the variable attenuator attenuates the second pulse, the pulse b, to a single photon level, and a phase modulator (PM) 1524 acts on the attenuated pulse b, applying phase shift corresponding to a transmission basis and bit informa-tion selected in the BB84 protocol among 0, $\pi/2$, it and $3\pi/2$. The pulses a and b are reflected from a Faraday rotator mirror (FM) 1525, so that polarized light is transmitted to Bob 1510 through the quantum channel in a state of being rotated by 90°.

Next, Bob 1510 receives the pulses a and b transmitted by Alice 1520 in the following order, and measures the stored bit information. Since polarized lights of the pulses a and b are rotated by 90° by the Faraday rotator mirror 1525 of Alice 1520, they pass through opposite paths in the polar-ization splitter of Bob 1510. For example, the pulse a passes through a long path 1515 and the pulse b passes through a short path 1514. The pulse a undergoes a phase shift of 0 or $\pi/2$ corresponding to the measurement basis selected by Bob

1510 by the phase modulator 1517 of the long path 1515, and the pulse b undergoes polarization rotation of 90° by a polarization controller (not shown) of the short path to have the same polarized light as the pulse a. The pulse a and b consequently travel paths having the same length and meet simultaneously at the beam splitter 1513 of Bob 1510 to cause interference. When measurement basis of Bob 1510 matches transmission basis of Alice 1520, the overlapping pulse is deterministically detected by one of a single photon detector (SPD) 1518-1 and a single photo detector 1518-2. If the transmission basis does not match, the pulse is stochastically detected by one of the single photon detector 1518-1 and the single photon detector 1518-2.

Figure 16:
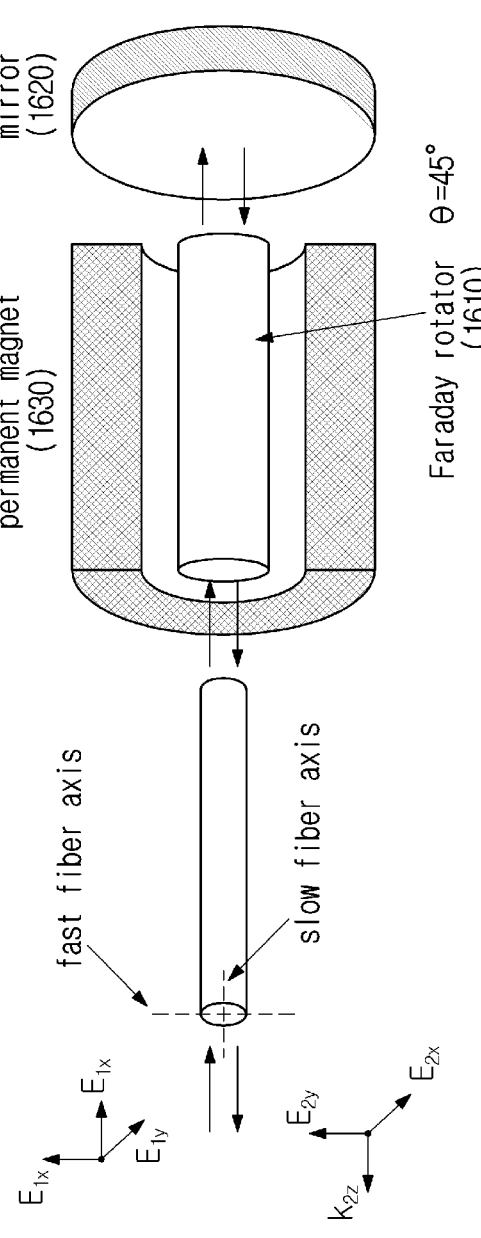
FIG. 16 illustrates a structure of a Faraday rotator mirror applicable to the present disclosure.

As described above, the effect of birefringence generated in the transmission path from Bob to Alice may be com-pensated for in the path from Alice to Bob. At this time, a Faraday rotator mirror plays a key role. The Faraday rotator mirror may be configured as shown in FIG. 16 below. FIG. 16 illustrates a structure of a Faraday rotator mirror appli-cable to the present disclosure. Referring to FIG. 16, the Faraday rotator mirror includes a Faraday rotator 1610, a mirror 1620, and a permanent magnet 1630. The Faraday rotator 1610 is based on Faraday's law, which explains that when light passes through a magnetic field, it receives a force in a certain direction and rotates. The rotation angle of polarized light by the Faraday rotator 1610 may be calcu-lated as in [Equation 1] below.

$$\beta = VBd \qquad \text{[Equation 1]}$$

In [Equation 1], $\beta$ denotes a rotation angle [radian], V denotes a Verdet constant [radian/(T·m)], B denotes mag-netic flux density [T], d denotes a length [m] of a path where the interaction between light and magnetic field occurred.

Figure 17A:
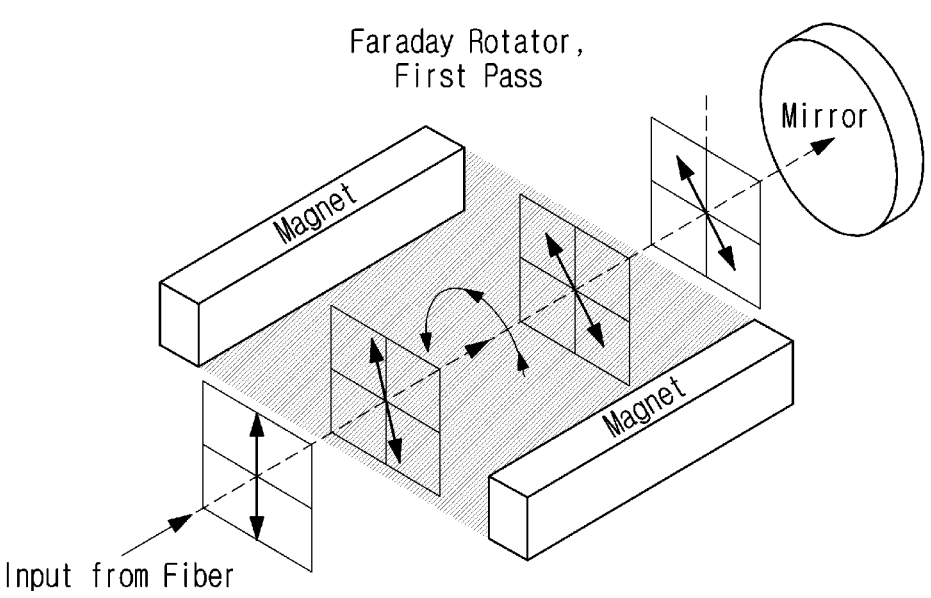
FIGS. 17A and 17B illustrate polarization rotation in a Faraday rotator mirror applicable to the present disclosure.
Figure 17B:
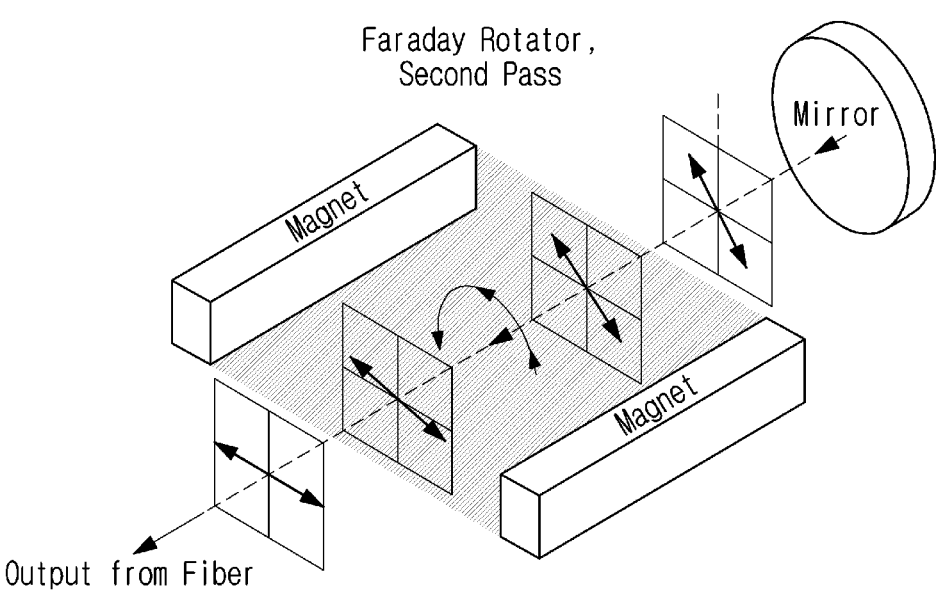

FIGS. 17A and 17B illustrate polarization rotation in a Faraday rotator mirror applicable to the present disclosure. FIG. 17A illustrates an incident situation, and FIG. 17B illustrates a reflected situation. The Faraday rotor used in the Faraday rotation mirror has a rotation angle set at 45°. In an ideal case, polarization rotation of 90° in total is achieved by 45° each when the light is incident on and reflected from the Faraday rotator mirror. Therefore, in the path from Bob to Alice, a polarization component perpendicular to an optical axis and a polarization component horizontal to the optical axis are reversed in the path from Alice to Bob. This means that the two components experience opposite time delay due to birefringence in the path from Bob to Alice and the path from Alice to Bob. As a result, since the two components experience the same time delay while traveling back and forth between Bob and Alice, Bob receives a signal in which polarization deviation due to birefringence is compensated for in the returned pulse. However, there is a polarization rotation of 90° by the Faraday rotator mirror.

Specific Embodiment of the Present Disclosure

The present disclosure is to improve use efficiency of a quantum channel in a communication system supporting bi-directional quantum key distribution. More particularly, the present disclosure relates to technology for transferring information during forward transmission in a bi-directional quantum key distribution procedure.

A bi-directional method such as a PnP method has an advantage of eliminating errors due to a path difference between a device operating as Alice (hereinafter referred to as "Alice device") and a device operating as Bob (herein-after referred to as "Bob device"). In the case of a unidi-rectional quantum key distribution method, an interferometer is required to be included in each of the Alice device and the Bob device in order to implement a phase encoding method. At this time, a path difference may occur due to an error in a device configuration between two interferometers, and a separate feedback or device configuration for correcting the path difference is required. However, as described above, in the case of a bi-directional quantum key distribution method, since the same Mach-Zehnder Interferometer included in the Bob device is used during transmission and reception, the same problems as the unidirectional quantum key distribution method does not occur and a separate device for correction is not required.

The advantage of auto compensation of the above-described bi-directional quantum key distribution system may be seen as being obtained by consuming twice as many quantum channels than the unidirectional quantum key distribution system. Therefore, there is a disadvantage that a secret key rate is relatively lower than that of the unidirectional quantum key distribution method. In particular, during forward transmission from the Bob device to the Alice device, quantum channels are consumed due to transmission of pulses including no information. Accordingly, the present disclosure proposes a method of utilizing pulses transmitted in the forward direction.

In the present disclosure, forward transmission refers to transmission from a light source of Bob to Alice, and reverse transmission means transmission from an encoding device of Alice to a single photo detection (SPD) of Bob. According to various embodiments, in forward transmission, Bob encodes and transmits information to Alice. Information to be encoded may be defined in various ways. For example, the information to be encoded may be unrelated to sift key generation or related to sift key generation. Specifically, the information to be encoded may be for transferring information or for assisting in generating a sift key. In the following description, bits representing information to be encoded during forward transmission are referred to as 'assistance bits'.

Figure 18:
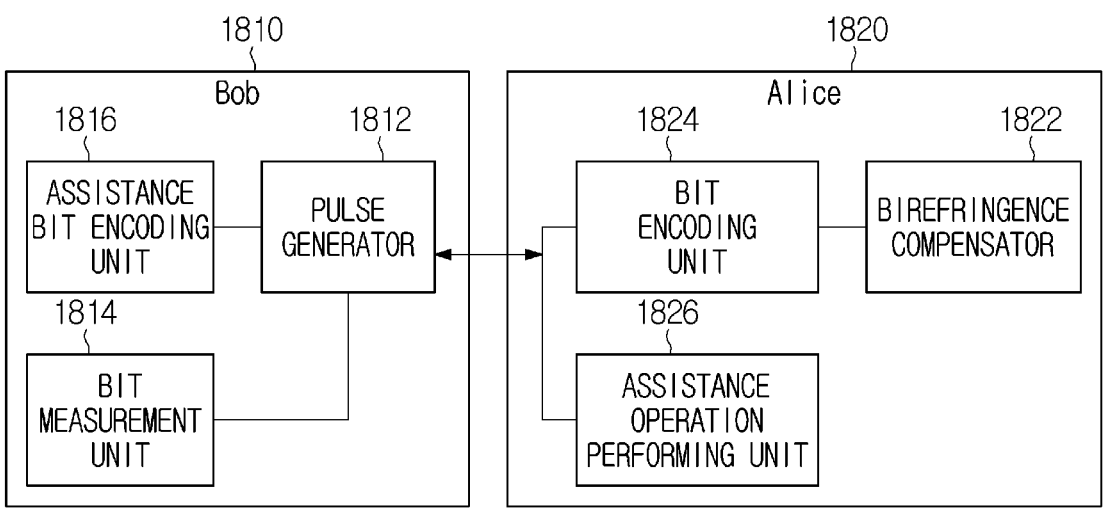
FIG. 18 illustrates a communication system supporting quantum key distribution according to an embodiment of the present disclosure.

FIG. 18 illustrates a communication system supporting quantum key distribution according to an embodiment of the present disclosure. FIG. 18 illustrates structures of a first device 1810 operating as Bob and a second device 1820 operating as Alice in a quantum key distribution procedure.

Referring to FIG. 18, the first device 1810 includes a pulse generator 1812, a bit measurement unit 1814, and an assistance bit encoding unit 1816. The pulse generator 1812 generates a pulse including at least one photon. The pulse may be used as a reference pulse in bi-directional quantum key distribution. The bit measurement unit 1814 estimates bits encoded in a reverse pulse fed back by the second device 1820. The assistance bit encoding unit 1816 generates a pulse (hereinafter, referred to as a 'forward pulse') including at least one assistance bit and transmitted in a forward direction, by encoding the at least one assistance bit in a reference pulse. Accordingly, at least one assistance bit may be transmitted to the second device 1820 through the forward pulse. In the structure illustrated in FIG. 18, the assistance bit encoding unit 1816 and the pulse generator 1812 are shown as separate components. However, depending on the implementation, the assistance bit encoding unit 1816 and the pulse generator 1812 may share at least one sub-component, or the assistance bit encoding unit 1816 may be part of the pulse generator 1812.

Referring to FIG. 18, the second device 1820 includes a birefringence compensator 1822, a bit encoding unit 1824, and an assistance operation performing unit 1826. The birefringence compensator 1822 compensates for polarization distortion due to birefringence by reflecting a received forward pulse and reciprocating on the same path. To this end, the birefringence compensator 1822 may include a Faraday rotation mirror. The bit encoding unit 1824 encodes a bit for generating a sift key in a forward pulse or reference pulse. The bit for generating the sift key is encoded in the pulse reflected by the Faraday rotating mirror, which generates a reverse pulse. The assistance operation performing unit 1826 performs an assistance operation corresponding to at least one assistance bit encoded in the forward pulse. According to various embodiments, specific details of the assistance operation may vary according to the use, purpose, and content of the assistance bit. For example, the assistance operation may include at least one of obtaining information by decoding at least one assistance bit or generating a reverse pulse using the at least one assistance bit. In the structure illustrated in FIG. 18, the assistance operation performing unit 1826 and the bit encoding unit 1824 are shown as separate components. However, depending on implementation, the assistance operation performing unit 1826 and the bit encoding unit 1824 may share at least one sub-component, or the assistance operation performing unit 1826 may be part of the bit encoding unit 1824.

As shown in FIG. 18, the devices include components for a quantum key distribution procedure and encoding and utilization of the assistance bit. That is, although, for convenience of description, in FIG. 18, the devices are illustrated as being composed of only components for the quantum key distribution procedure and encoding/utilization of the assistance bit, it is obvious that other components for operation in the communication system (e.g., a circuit for communication in a classical channel, a processor for calculation and control, a memory for storing data, a battery for supplying power, means for interfacing with a user, etc.) may be further included.

FIG. 19 illustrates an example of a procedure for transmitting assistance information and generating a sift key in a communication system according to an embodiment of the present disclosure. FIG. 19 illustrates a method of operating a device (e.g., the first device 1810 of FIG. 18) operating as Bob in a quantum key distribution procedure.

Referring to FIG. 19, in step S1901, the device encodes at least one assistance bit in a reference pulse. That is, the device generates a forward pulse by encoding at least one assistance bit in the reference pulse. The forward pulse is a laser pulse including at least one photon and is transmitted through a quantum channel. The transmission basis used to encode the assistance bit may be selected arbitrarily or according to a pre-agreement.

In step S1903, the device transmits a forward pulse including at least one assistance bit. By encoding at least one assistance bit, the forward pulse may have a different structure from the reference pulse of a general bi-directional quantum key distribution procedure.

In step S1905, the device receives reverse pulses including at least one bit for generating a sift key. At least one bit included in the reverse pulses has been encoded based on one of a plurality of candidate transmission bases. The transmission bases used for encoding is arbitrarily selected by the counterpart device (e.g., the device that has transmitted the reverse pulses).

In step S1907, the device generates a sift key based on the reverse pulses. That is, the device measures at least one bit included in the reverse pulses, and generates a sift key based on the measurement result. To this end, the device determines whether the transmission basis and the measurement basis match for each reverse pulse through information exchange with the counterpart device, and generates a sift key using the measured bits when the transmission basis and the measurement basis match.

FIG. 20 illustrates an example of a procedure for receiving assistance information and generating a sift key in a communication system according to an embodiment of the present disclosure. FIG. 20 illustrates a method of operating a device (e.g., the second device 1820 of FIG. 18) operating as Alice in a quantum key distribution procedure.

Referring to FIG. 20, in step S2001, the device receives a forward pulse including at least one assistance bit. The forward pulse is a laser pulse including at least one photon and is received through a quantum channel. By including at least one assistance bit, the forward pulse may have a different structure from the reference pulse of a general bi-directional quantum key distribution procedure.

In step S2003, the device generates reverse pulses based on at least one assistance bit included in the reference pulse. A specific operation, process, or calculation for generating the reverse pulses may vary depending on the purpose or form of the assistance bit. According to an embodiment, the device may generate reverse pulses by encoding at least one bit for generating a sift key after removing at least one assistance bit included in the forward pulse. In this case, at least one removed assistance bit may be used as independent information. According to another embodiment, the device may generate reverse pulses by encoding at least one bit for generating a sift key based on at least one assistance bit included in the forward pulse. In this case, a processing result for at least one assistance bit may represent at least one bit for generating a sift key.

In step S2005, the device transmits the reverse pulses. The device transmits the reverse pulses including at least one bit for generating a sift key. The reverse pulses are transmitted through the quantum channel. At this time, at least one bit for generating a sift key included in the reverse pulses was encoded based on a transmission basis arbitrarily selected by the device.

In step S2007, the device generates a sift key. The device may determine whether the transmission basis and the measurement basis match for each reverse pulse through information exchange with the counterpart device, and generate a sift key using the measured bits when the transmission basis and the measurement basis match.

As described above, devices according to various embodiments may utilize assistance bits while performing a bi-directional quantum key distribution procedure. The assistance bits may be used for various purposes, and operations related to the assistance bits may vary according to the purpose of the assistance bits. Hereinafter, specific embodiments of the use of assistance bits will be described in the present disclosure. Specifically, according to the type of information represented by assistance bits transferred in forward transmission, 1) an embodiment of transferring public information in forward transmission as a bi-directional encoding-based quantum key distribution protocol for improving channel utilization and 2) an embodiment of transferring quantum state information in forward transmission as a bi-directional encoding-based quantum key distribution protocol for security improvement will be described.

According to an embodiment, in order to improve channel utilization, additional information (e.g., public information) may be transferred through assistance bits. Here, public information means information transferred in an unencrypted state. When public information is transferred using forward transmission, an effect of improving channel utilization is expected.

Figure 21:
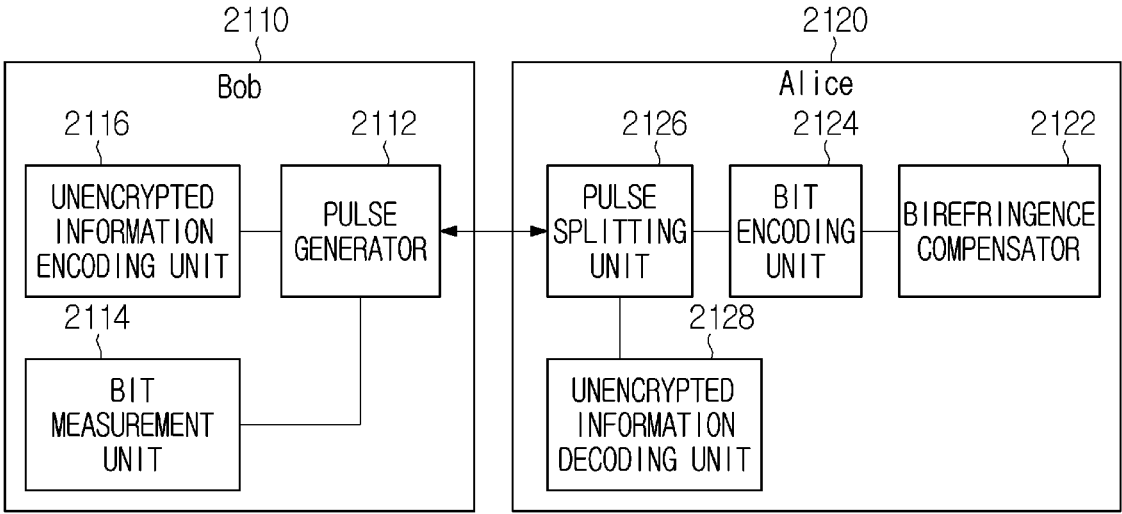
FIG. 21 illustrates an example of a configuration of devices for transferring public information through a quantum key distribution procedure in a communication system supporting quantum key distribution according to an embodiment of the present disclosure.

FIG. 21 illustrates an example of a configuration of devices for transferring public information through a quantum key distribution procedure in a communication system supporting quantum key distribution according to an embodiment of the present disclosure. FIG. 21 illustrates structures of a first device 2110 operating as Bob and a second device 2120 operating as Alice in a quantum key distribution procedure including public information transfer. The structure of the devices illustrated in FIG. 21 may be understood as an example of FIG. 18.

Referring to FIG. 21, the first device 2110 includes a pulse generator 2112, a bit measurement unit 2114, and an unencrypted information encoding unit 2116. The pulse generator 2112 generates a pulse including at least one photon. The pulse may be used as a reference pulse or forward pulse in bi-directional quantum key distribution. The bit measurement unit 2114 estimates a bit encoded in a reverse pulse fed back by the second device 2120 having received a forward pulse. The unencrypted information encoding unit 2116 generates a forward pulse by encoding at least one bit in the reference pulse. The bit to be encoded is encoded without encryption, and thus may be referred to as public information or unencrypted information. Accordingly, unencrypted information may be transmitted to the second device 2120 through the forward pulse. In the structure illustrated in FIG. 21, the unencrypted information encoding unit 2116 and the pulse generator 2112 are shown as separate components. However, depending on the implementation, the unencrypted information encoding unit 2116 and the pulse generator 2112 may share at least one sub-component, or the unencrypted information encoding unit 2116 may be part of the pulse generator 2112.

Referring to FIG. 21, the second device 2120 includes a birefringence compensator 2122, a bit encoding unit 2124, a pulse splitting unit 2126, and an unencrypted information decoding unit 2128. The birefringence compensator 2122 compensates for polarization distortion due to birefringence by reciprocating on the same path through a reflection process including 90-degree rotation of the polarization state of a forward pulse. To this end, the birefringence compensator 2122 may include a Faraday rotation mirror. Here, a pulse reflected by the Faraday rotation mirror is a reference pulse restored to a reference state by removing unencrypted information from the forward pulse. The bit encoding unit 2124 generates at least one reverse pulse by encoding a bit for generating a sift key in the restored reference pulse. The bit for generating the sift key is encoded in the pulses reflected by the Faraday rotation mirror, which generates a reverse pulse. The pulse splitting unit 2126 provides a forward pulse including unencrypted information to the unencrypted information decoding unit 2128, provides a reference pulse restored to a reference state to the birefringence compensator 2122, and outputs at least one reverse pulse to the quantum channel. The unencrypted information decoding unit 2128 obtains the unencrypted information included in a forward pulse. Also, the unencrypted information decoding unit 2128 restores the forward pulse to a reference state by removing the unencrypted information included in the forward pulse. In the structure illustrated in FIG. 21, the unencrypted information decoding unit 2128 and the bit encoding unit 2124 are shown as separate components. However, depending on the implementation, the unencrypted information decoding unit 2128 and the bit encoding unit 2124 may share at least one sub-component, or the unencrypted information decoding unit 2128 may be part of the bit encoding unit 2124.

In the bi-directional quantum key distribution protocol including the transfer of public information according to an embodiment, the operation of Alice and Bob is as follows.

Step 1. Bob transmits a pulse train, in which public information is encoded, to Alice. The pulse train is composed of an intense laser pulse composed of multiple photons rather than a single photon state. Public information may be public information that is transferred from Bob to Alice and does not require encryption. When encoding the public information in the pulse train, Bob may apply a transmission basis according to an agreed pattern. The agreed pattern may be shared between Alice and Bob through a classical channel.

Step 2. Alice receives the pulse train in which the public information is encoded, from Bob and splits it into a first pulse train and a second pulse train.

Step 3. Alice decodes the public information using the first pulse train, and restores the second pulse train to a reference state through the decoded public information. When decoding the first pulse train, Alice may apply the measurement basis according to the agreed pattern. The agreed pattern is the same as the pattern used by Bob in Step 1. Restoring the second pulse train to the reference state means that Bob processes the forward pulse in a state in which the public information is removed, so that Alice may input bit information for generating a sift key.

Step 4. Alice encodes bit information for generating a sift key in the reference pulse train obtained by restoring the second pulse train, and transmits it to Bob. When encoding bit information in the reference pulse train, Alice may select and apply an arbitrary transmission basis among two orthogonal transmission bases. When transmitting a pulse train, in which bit information is encoded, to Bob, Alice lowers the intensity of the pulse train to a single photon level and transmits it.

Step 5. Bob receives the pulse train transmitted by Alice and decodes the stored bit information. When decoding bit information, Bob may select and apply one measurement basis arbitrarily among two orthogonal measurement bases.

Step 6. Alice and Bob share the transmission basis and measurement basis for bit information through a classical channel, and obtain a sift key using only bit information in which the same basis is used.

Figure 22:
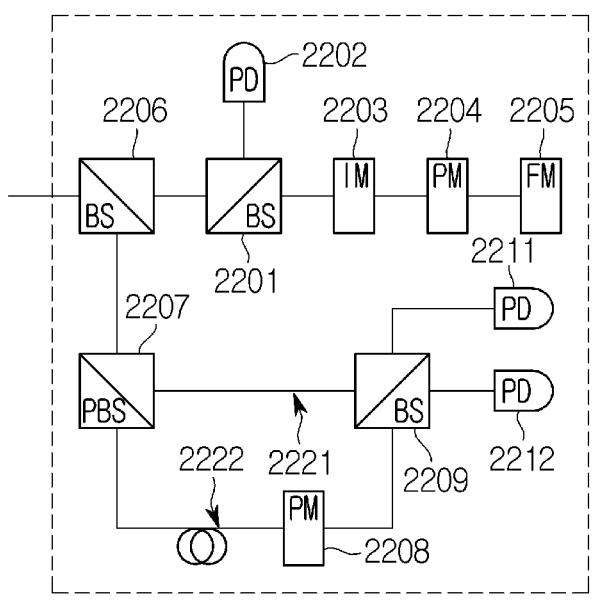
FIG. 22 illustrates a configuration of a device operating as Alice receiving public information through a quantum key distribution procedure in a communication system according to an embodiment of the present disclosure.

FIG. 22 illustrates a configuration of a device operating as Alice receiving public information through a quantum key distribution procedure in a communication system according to an embodiment of the present disclosure. FIG. 22 illustrates a configuration of a device (e.g., the second device 2120 of FIG. 21) for implementing a protocol for transferring public information.

Referring to FIG. 22, the device includes a beam splitter 2201, a photodiode 2202, an intensity modulator 2203, a phase modulator 2204, a Faraday rotation mirror 2205, a beam splitter 2206, and a polarization beam splitter 2207, a phase modulator 2208, a beam splitter 2209, a photodiode 2210, and a photodiode 2211. FIG. 22 mainly illustrates components on a path along which a pulse travels. However, the device may further include a control circuit for controlling operation of the illustrated components.

The beam splitter 2201 splits a portion of the forward pulse received through the quantum channel and provides it to the photodiode 2202. The photodiode 2202 measures the timing and intensity of the pulses split by the beam splitter 2201. The measured timing is used to generate a trigger signal for clock synchronization, and the measured intensity is used to adjust the pulse amplitude. The intensity modulator 2203 attenuates the pulse intensity to a single photon level according to the intensity measured by the photodiode 2202.

The beam splitter 2206 splits the forward pulse including the public information received from the Bob device and provides it to the polarization beam splitter 2207. The polarization beam splitter 2207 splits the pulse into a first path 2221 and a second path 2222 according to the polarization of the pulse. The second path 2222 includes a time delay element and a phase modulator 2208. Pulses, which have passed through the first path 2221 and the second path 2222, cause interference in the beam splitter 2209. Since the measurement basis for decoding the public information is predefined or negotiated to match the transmission basis used in the Bob device, the superimposed pulse may be deterministically detected by one of the photodiodes 2211 and 2212.

A pulse incident to an input port of the beam splitter 2206 through the quantum channel may be an intense pulse including a plurality of photons rather than a single photon unit. Accordingly, photons included in the pulse are reflected and transmitted in a ratio of about 50:50 on the reflective surface of the beam splitter 2206. Accordingly, half of the pulse travels along a path toward the polarization beam splitter 2207 and the other half travels along a path toward the beam splitter 2201. At this time, public information is decoded based on the measurement result of the photodiodes 2211 and 2212 for the pulse traveling toward the polarization beam splitter 2207.

The decoding result of public information is transferred to a control circuit (not shown), and the control circuit restores half of the forward pulse traveling from the beam splitter 2206 to the beam splitter 2201 to a reference pulse state by controlling the phase modulator 2204 based on the decoding result. In addition, the phase modulator 2204 may encode bit information for generating a quantum key. Here, encoding of bit information for generating the quantum key may be performed before or after being reflected by the Faraday rotation mirror 2205.

Compared to the structure illustrated in FIG. 15, the configuration shown in FIG. 22 may be understood as a form in which at least one component for decoding public information in forward transmission is added to the Alice device. Although FIG. 22 illustrates a structure in which both Alice and Bob operate based on a phase encoding method, it is obvious that the protocol for transferring public information according to an embodiment is applicable to even a structure in which an encoding method other than phase encoding is used. As described in step 1, since public information is transmitted in the form of an intense laser pulse, a single photon detector is not required in the Alice device, and a structure for decoding public information using a general photodetector may be implemented.

Figure 23:
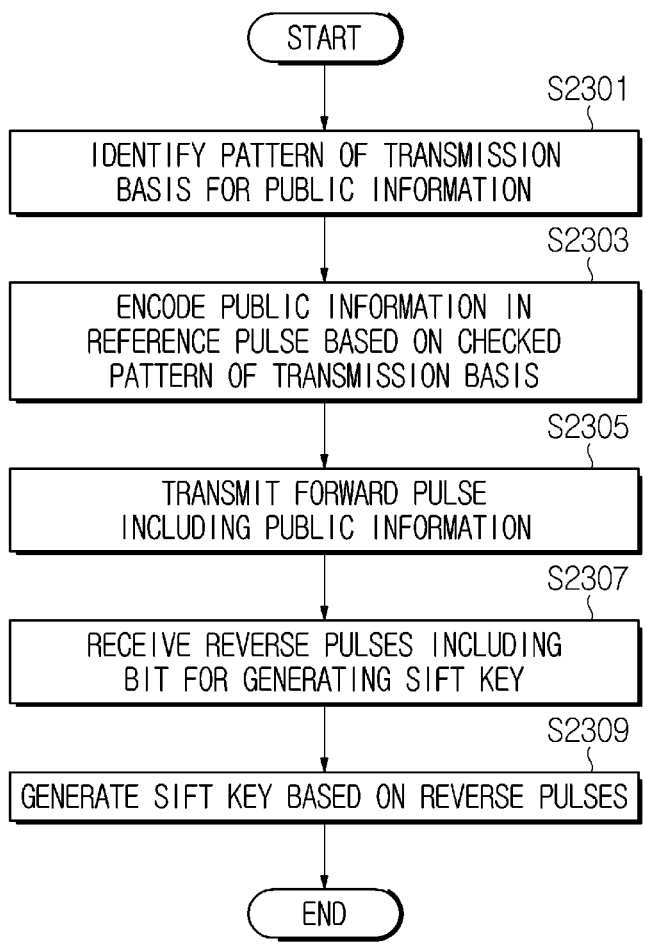
FIG. 23 illustrates an example of a procedure for transmitting public information and generating a sift key in a communication system according to an embodiment of the present disclosure.

FIG. 23 illustrates an example of a procedure for transmitting public information and generating a sift key in a communication system according to an embodiment of the present disclosure. FIG. 23 illustrates a method of operating a device (e.g., the first device 1810 of FIG. 18 or the first device 2110 of FIG. 21) operating as Bob in a quantum key distribution procedure.

Referring to FIG. 23, in step S2301, the device identifies a pattern of a transmission basis for public information. In other words, the device identifies the transmission bases used for transmission of public information. In order to transmit public information, only one transmission basis may be used or a plurality of transmission bases may be used according to a mutually agreed order. In this case, the pattern of the transmission basis may be shared with the counterpart device through a separate means (e.g., a classical channel).

In step S2303, the device encodes public information in a reference pulse based on the identified pattern of the transmission basis. In other words, the device generates a forward pulse by encoding at least one bit representing unencrypted information based on the pattern of the transmission basis.

In step S2305, the device transmits the forward pulse including public information. The pulse is a laser pulse including at least one photon and is transmitted through a quantum channel. By including the public information, the forward pulse may have a different structure from the reference pulse of a general bi-directional quantum key distribution procedure.

In step S2307, the device receives reverse pulses including at least one bit for generating a sift key. At least one bit included in the reverse pulses has been encoded based on one of a plurality of candidate transmission bases. The transmission basis used for encoding is arbitrarily selected by the counterpart device.

In step S2309, the device generates a sift key based on the reverse pulses. That is, the device measures at least one bit included in the reverse pulses, and generates a sift key based on the measurement result. To this end, the device may determine whether the transmission basis and the measurement basis match for each reverse pulse through information exchange with the counterpart device, and generate a sift key using the measured bits when the transmission basis and the measurement basis match.

Figure 24:
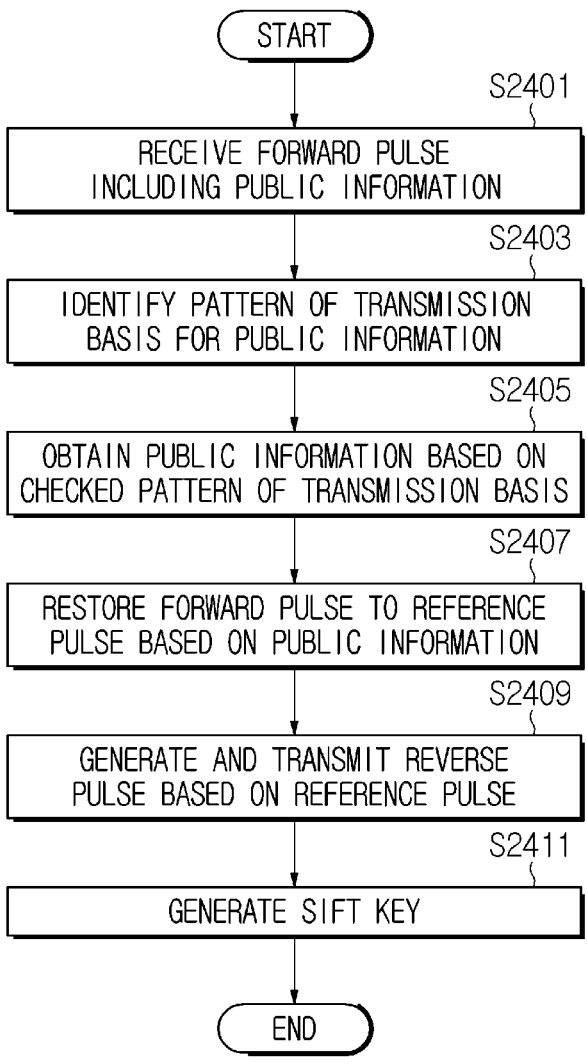
FIG. 24 illustrates an example of a procedure for receiving public information and generating a sift key in a communication system according to an embodiment of the present disclosure.

FIG. 24 illustrates an example of a procedure for receiving public information and generating a sift key in a communication system according to an embodiment of the present disclosure. FIG. 24 illustrates a method of operating a device (e.g., the second device 1820 of FIG. 18 or the second device 2120 of FIG. 21) operating as Alice in a quantum key distribution procedure.

Referring to FIG. 24, in step S2401, the device receives a forward pulse including public information. The forward pulse is a laser pulse including a plurality of photons and is received through a quantum channel. By including public information, the forward pulse may have a different structure from the reference pulse of a general bidirectional quantum key distribution procedure.

In step S2403, the device identifies a pattern of a transmission basis for public information. In other words, the device identifies the transmission bases used for transmission of public information. In order to transmit public information, only one transmission basis may be used or a plurality of transmission bases may be used according to a mutually agreed order. In this case, the pattern of the transmission basis may be shared with the counterpart device through a separate means (e.g., a classical channel). That is, for decoding in the next step, the device identifies the predefined pattern of the transmission basis.

In step S2405, the device obtains public information based on the identified pattern of the transmission basis. In other words, the device obtains at least one bit representing unencrypted information by decoding based on the pattern of the transmission basis. The obtained public information may be processed by other layers or other applications.

In step S2407, the device restores the forward pulse to a reference pulse based on the public information. In other words, the device may restore the forward pulse to a state before encoding the public information, that is, to a reference state. The device receives the forward pulse including the public information, and obtains the public information from the forward pulse, which may restore the reference pulse.

In step S2409, a reverse pulse is generated and transmitted based on the reference pulse. For example, the device may generate reverse pulses by encoding at least one bit for generating a sift key in a reference pulse. In addition, the device transmits reverse pulses including at least one bit for generating a sift key. The reverse pulses are transmitted through the quantum channel. At this time, at least one bit for generating the sift key included in the reverse pulses is encoded based on a transmission basis arbitrarily selected by the device.

In step S2411, the device generates a sift key. The device may determine whether the transmission basis and the measurement basis match for each reverse pulse through information exchange with the counterpart device, and generate a sift key using the measured bits when the transmission basis and the measurement basis match.

According to an embodiment, in order to improve security, quantum state information may be transferred using forward transmission as a bi-directional encoding-based quantum key distribution protocol. In the case of transferring bit information related to sift key generation using forward transmission, an effect of improving security of a quantum key distribution system is expected.

Figure 25:
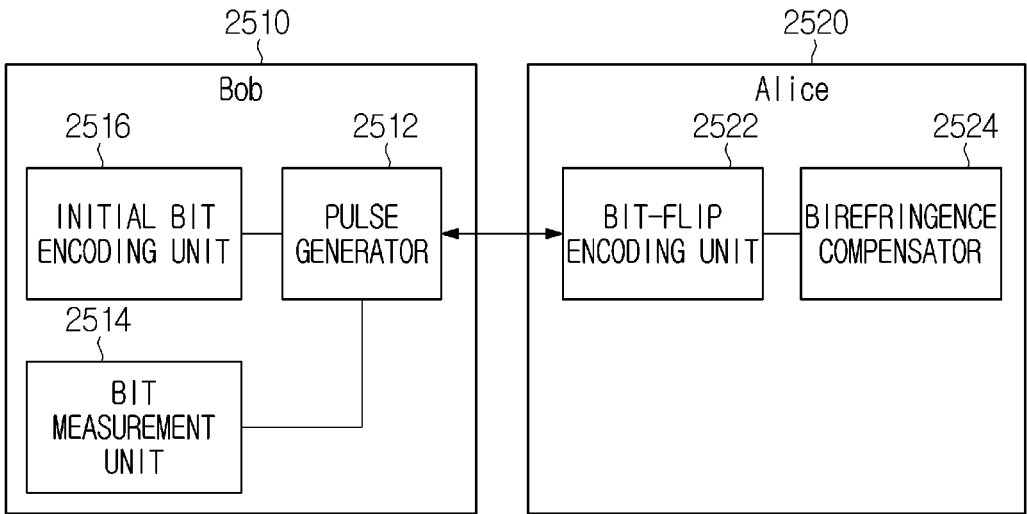
FIG. 25 illustrates an example of a configuration of devices that perform a quantum key distribution procedure using bit information transferred in a forward direction in a communication system supporting quantum key distribution according to an embodiment of the present disclosure.

FIG. 25 illustrates an example of a configuration of devices that perform a quantum key distribution procedure using bit information transferred in a forward direction in a communication system supporting quantum key distribution according to an embodiment of the present disclosure. FIG. 25 illustrates structures of a first device 2510 operating as Bob and a second device 2520 operating as Alice in a quantum key distribution procedure including forward quantum state information transfer. The structures of the devices illustrated in FIG. 25 may be understood as an example of FIG. 18.

Referring to FIG. 25, the first device 2510 includes a pulse generator 2512, a bit measurement unit 2514, and an initial bit encoding unit 2516. The pulse generator 2512 generates a pulse including at least one photon. The pulse may be used as a reference pulse or forward pulse in bidirectional quantum key distribution. The bit measurement unit 2514 estimates a bit encoded in a reverse pulse fed back by the second device 2520 that has received the forward pulse. The initial bit encoding unit 2516 generates a forward pulse by encoding at least one initial bit in the reference pulse. The initial bit to be encoded is transmitted for bit-flip encoding performed by the second device 2520, and may be used as a reference for interpreting a result of bit-flip encoding in the first device 2520. Accordingly, the initial bit may be transmitted to the second device 2520 through the forward pulse. In the structure illustrated in FIG. 25, the initial bit encoding unit 2516 and the pulse generator 2512 are shown as separate components. However, depending on implementation, the initial bit encoding unit 2516 and the pulse generator 2512 may share at least one sub-component, or the initial bit encoding unit 2516 may be part of the pulse generator 2512.

Referring to FIG. 25, the second device 2520 includes a birefringence compensator 2522 and a bit-flip encoding unit 2524. The birefringence compensator 2522 compensates for polarization distortion due to birefringence by reciprocating on the same path through a reflection process including 90-degree rotation of the polarization state of the forward pulse. To this end, the birefringence compensator 2522 may include a Faraday rotation mirror. The bit-flip encoding unit 2524 performs bit-flip encoding on the initial bits encoded in the first device 2510. In this case, the second device 2520 may arbitrarily select and use one transmission basis among a plurality of candidate transmission bases.

In the quantum key distribution protocol that transfers quantum state information in the forward direction according to an embodiment, the operations of Alice and Bob are as follows.

Step 1. Bob transmits a pulse train, in which bit information is encoded, to Alice. The pulse train is composed of a single photon pulse. When encoding the bit information in the pulse train, Bob may select and apply any of two orthogonal transmission bases.

Step 2. Alice encodes bit information based on bit-flip encoding in the forward pulse train received from Bob, and transmits the pulse train including the bit information. Bit-flip encoding may represent bit '0' by returning received bit information without change, and represent bit '1' by inverting the received bit information and returning it. Bit-flip encoding does not require decoding or measurement of received bit information. When bit-flip encoding is performed, Alice may arbitrarily select and apply one transmission basis among two orthogonal transmission bases.

Step 3. Bob receives the pulse train transmitted by Alice and decodes the bit information. When decoding the bit information, Bob applies the same basis as the transmission basis used by Bob in step 1 as the measurement basis. When decoding the bit information, Bob may map the case where the bit transmitted by Bob in step 1 is measured without change to a bit '0', and map the case where the opposite bit information is measured to a bit '1'.

Step 4. Alice and Bob share Alice's transmission basis and Bob's measurement basis, which are used for reverse transmission of bit information through a classical channel, and obtain a sift key using only the bit information in which the same basis is used.

Figure 26:
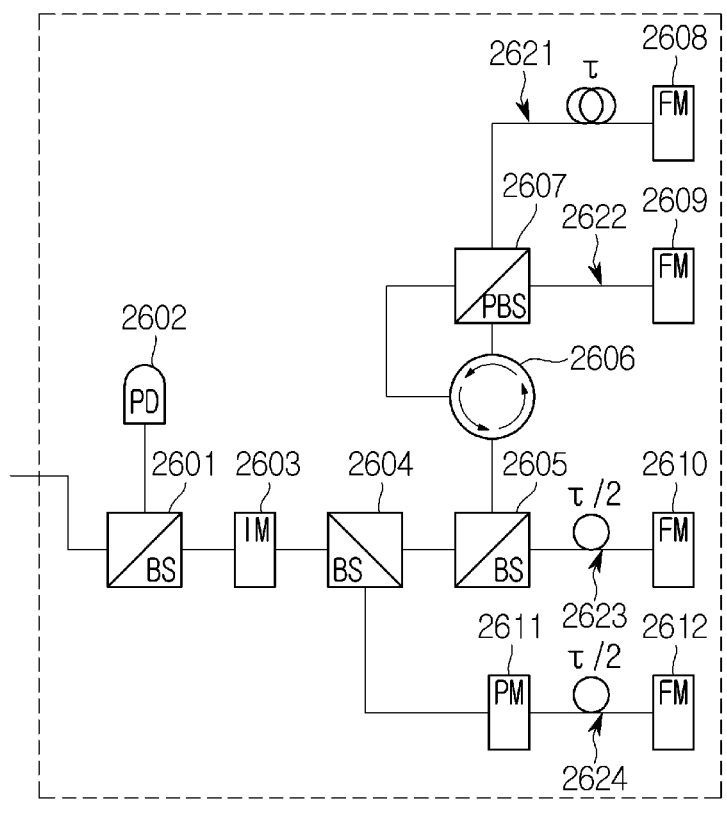
FIG. 26 illustrates a configuration of a device operating as Alice performing a quantum key distribution procedure using bit information transferred in a forward direction in a communication system according to an embodiment of the present disclosure.

FIG. 26 illustrates a configuration of a device operating as Alice performing a quantum key distribution procedure using bit information transferred in a forward direction in a communication system according to an embodiment of the present disclosure. FIG. 26 illustrates a configuration of a device (e.g., the second device 2520 of FIG. 25) for implementing a protocol for transferring quantum state information in the forward direction.

Referring to FIG. 26, the device includes a beam splitter 2601, a photodiode 2602, an intensity modulator 2603, a phase modulator 2604, a beam splitter 2605, a circulator 2606, and a polarization beam splitter 2607, a Faraday rotation mirror 2608, a Faraday rotation mirror 2609, a Faraday rotation mirror 2610, a phase modulator 2611, and a Faraday rotation mirror 2612. FIG. 26 mainly illustrates components on a path along which a pulse travels. However, the device may further include a control circuit for controlling operation of the illustrated components.

The beam splitter 2601 splits a portion of the forward pulse received through the quantum channel and provides it to the photodiode 2202. The photodiode 2202 measures the timing and intensity of the pulses split by the beam splitter 2601. The measured timing is used to generate a trigger signal for clock synchronization, and the measured intensity is used to adjust the pulse amplitude. The intensity modulator 2603 attenuates the pulse intensity to a single photon level according to the intensity measured by the photodiode 2202. However, according to another embodiment, the intensity attenuation operation of the intensity modulator 2603 may be omitted. For example, when the forward pulse has the intensity of a single photon level, since the amplitude of the pulse output from the beam splitter 2601 is already at a single photon level, the intensity attenuation operation of the intensity modulator 2603 is omitted or the beam splitter 2601, the photodiode 2602 and the intensity modulator 2603 may be excluded.

The beam splitter 2604, the beam splitter 2605, the circulator 2606, and the polarization beam splitter 2607 split the pulse into a path corresponding to the selected transmission basis among four paths 2621 to 2624. The beam splitter 2604 is a 50:50 beam splitter, and the probability that a pulse is output to the upper path among the two output paths is ½, and the probability that the pulse is output to the lower path is ½. Therefore, it may be interpreted that, if it is output to the upper path toward the beam splitter 2605 with a probability of ½, the time-bin encoding basis is selected by random selection, and if it is output to the lower path toward the phase modulator 2611 with a probability of ½, the phase encoding basis is selected by random selection. Similarly, the beam splitter 2605 randomly selects whether to perform bit flipping, by outputting pulses with a probability of ½ for each of the two paths. The circulator 2606 outputs the pulse from the beam splitter 2605 to the polarization beam splitter 2607, and outputs the pulse from the polarization beam splitter 2607 to the beam splitter 2605. The polarization beam splitter 2607 splits the pulses from the circulator 2606 according to polarization.

The first path 2621 includes a time delay element of time τ, and includes a Faraday rotation mirror 2608 at the end thereof. The second path 2622 includes a Faraday rotation mirror 2609 at the end thereof, without time delay. The third path 2623 includes a time delay element of time τ/2 and includes a Faraday rotation mirror 2610 at the end thereof. The fourth path 2624 includes a time delay element of time τ/2 and a phase modulator 2611, and includes a Faraday rotation mirror 2612 at the end thereof. Based on the structural differences discussed above, the first path 2621 flips a fast time-bin to a slow time-bin by imposing time delay, and the second path 2622 flips a slow time-bin to a fast time-bin, the third path 2623 maintains a bit value, and the fourth path 2624 sets the phase shift value of the phase modulator 2611 to 0 or π to maintain the phase of 0 or π, or flip the phase from 0 to π or from 0 to π.

Compared to the structure illustrated in FIG. 15, the configuration shown in FIG. 26 may be understood as a form in which an intensity modulator is added to the Alice device. Although FIG. 26 illustrates a structure when both Alice and Bob operate based on a time-bin phase encoding method, it is obvious that the protocol using bit information transferred in the forward direction according to an embodiment is also applicable to a structure in which an encoding methods other than time-bin phase encoding is used. As shown in FIG. 26, the Alice device includes a bit-flip encoding device for time-bin encoding and phase encoding.

Referring to FIG. 26, the Alice device branches into four paths 2621 to 2624 at the end thereof. Among the four paths 2621 to 2624, the two top paths 2621 and 2622 branching from the polarization beam splitter 2607 perform bit flip for time-bin encoding. The third path 2623 performs a function for maintaining and returning the received bit for time-bin encoding, and the fourth path 2624 applies a phase shift of 0 or π through the phase modulator 2611, thereby maintaining received bits without change or performing bit flip for phase encoding, that is, phase flip encoding. For example, bit-flip encoding may correspond to a Pauli-X gate operation among Pauli gates, and phase flip encoding may correspond to a Pauli-Z gate operation.

In the case of the time-bin encoding method, a logical bit of 0 or 1 is encoded by selecting only one of a fast bin and a slow bin and transmitting a pulse in the corresponding bin. In the Alice device of FIG. 26, the first path 2621 is a component for an operation of converting a fast bin into a slow bin by performing bit flipping when the fast bin is transmitted, and time delay of a total of $2\pi$ is applied to the Faraday rotation mirror by applying i during incidence and reflection. The second path 2622 is a component for an operation of converting a slow bin into a fast bin by performing bit flipping when the slow bin is transmitted, and time delay is not applied.

Here, $\tau$ is a value corresponding to a time difference between the fast bin and the slow bin. Rather than $\tau$, total time delay of $2\tau$ is applied to bit-flip the fast bin to the slow bin on the first path 2621, by the reference time of all pulses slowing down by $\tau$ due to the time difference between the fast bin and the slow bin, despite of not applying time delay to bit-flip the slow bin to the fast bins on the second path 2622. As a result, even in the third and fourth paths, time delay of $\tau$ is included in the third path 2623 and the fourth path 2624, so that the reference time of all pulses is uniformly delayed by $\tau$ regardless of the basis selected by Alice.

Figure 27:
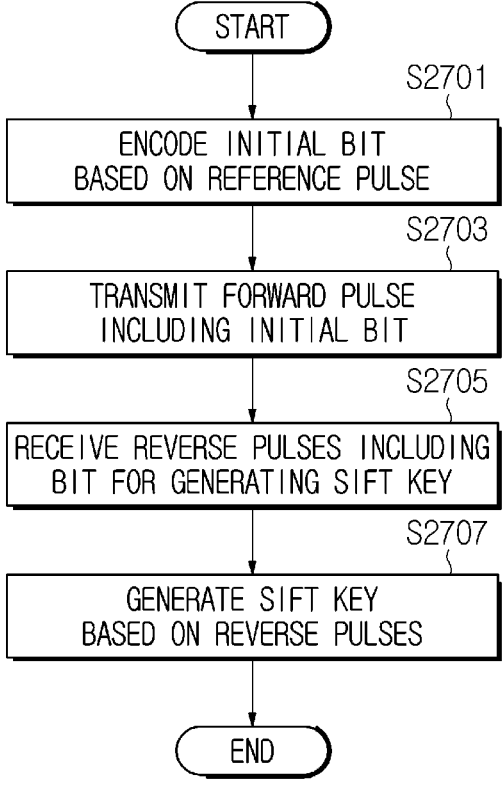
FIG. 27 illustrates an example of a procedure for transmitting bit information in a forward direction and generating a sift key in a communication system according to an embodiment of the present disclosure.

FIG. 27 illustrates an example of a procedure for transmitting bit information in a forward direction and generating a sift key in a communication system according to an embodiment of the present disclosure. FIG. 27 illustrates a method of operating a device (e.g., the first device 1810 of FIG. 18 or the first device 2510 of FIG. 25) operating as Bob in a quantum key distribution procedure.

Referring to FIG. 27, in step S2701, the device encodes at least one initial bit in a reference pulse. That is, the device generates a forward pulse by encoding at least one initial bit in the reference pulse. The forward pulse is a laser pulse including at least one photon and is transmitted through a quantum channel. The transmission basis used to encode the initial bit may be selected arbitrarily.

In step S2703, the device transmits a forward pulse including at least one initial bit. By encoding at least one initial bit, the forward pulse may have a different structure from a reference pulse of a general bidirectional quantum key distribution procedure.

In step S2705, the device receives reverse pulses including at least one bit for generating a sift key. At least one bit included in the reverse pulses has been encoded based on one of a plurality of candidate transmission bases. The transmission bases used for encoding is arbitrarily selected by the counterpart device (e.g., the device that has transmitted the reverse pulses).

In step S2707, the device generates a sift key based on the reverse pulses. That is, the device measures at least one bit included in the reverse pulses, and generates a sift key based on the measurement result. To this end, the device may determine whether Alice's transmission basis and Bob's measurement basis used for reverse transmission match each reverse pulse through information exchange with the counterpart device, and generate a sift key using only the bit information in which the same basis is used.

Figure 28:
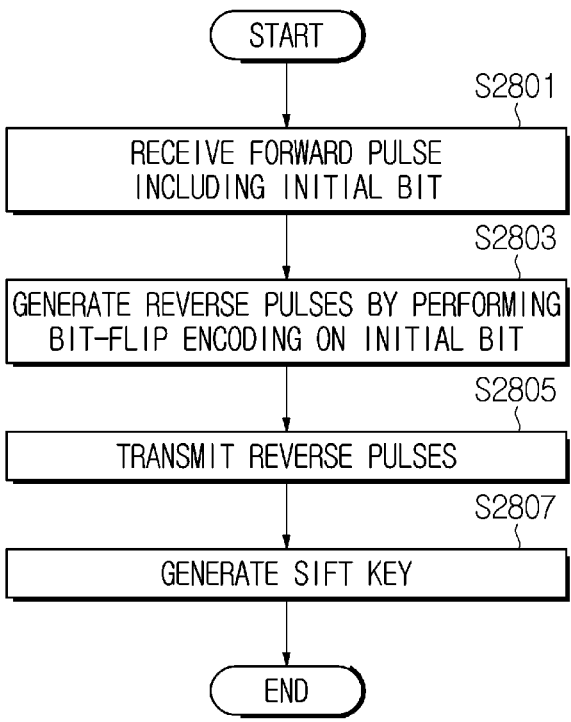
FIG. 28 illustrates an example of a procedure for receiving bit information in a forward direction and generating a sift key in a communication system according to an embodiment of the present disclosure.

FIG. 28 illustrates an example of a procedure for receiving bit information in a forward direction and generating a sift key in a communication system according to an embodiment of the present disclosure. FIG. 28 illustrates a method of operating a device (e.g., the second device 1820 of FIG.

18 or the second device 2520 of FIG. 25) operating as Alice in a quantum key distribution procedure.

Referring to FIG. 28, in step S2801, the device receives a forward pulse including at least one initial bit. The forward pulse is a laser pulse including at least one photon and is received through a quantum channel. By including at least one initial bit, the forward pulse may have a different structure from a reference pulse of a general bidirectional quantum key distribution procedure.

In step S2803, the device generates reverse pulses by performing bit-flip encoding on at least one initial bit. That is, the device may generate reverse pulses by encoding at least one bit for generating a sift key based on at least one initial bit included in the forward pulse. To this end, the device may arbitrarily select one transmission basis from among a plurality of candidate transmission bases.

In step S2805, the device transmits the reverse pulses. The device transmits the reverse pulses including at least one bit for generating a sift key. The reverse pulses are transmitted through a quantum channel. At this time, at least one bit for generating a sift key included in the reverse pulses was encoded based on a transmission basis arbitrarily selected by the device.

In step S2807, the device generates a sift key. The device may determine whether Alice's transmission basis and Bob's measurement basis used for reverse transmission match for each reverse pulse through information exchange with the counterpart device, and generate a sift key using only the bit information in which the same basis is used.

Application Example of Embodiment

In a communication system, devices may generate a sift key by performing a quantum key distribution procedure. At this time, according to various embodiments described above, devices operating as Alice and Bob may utilize information transferred in the forward direction. A quantum key distribution procedure including information transfer in the forward direction may be applied to communication between various devices. For example, in communication between a base station and a terminal, a quantum key distribution procedure according to various embodiments described above may be performed. An example of operations of a base station and a terminal to which a quantum key distribution procedure according to various embodiments is applied is shown in FIG. 29 below.

Figure 29:
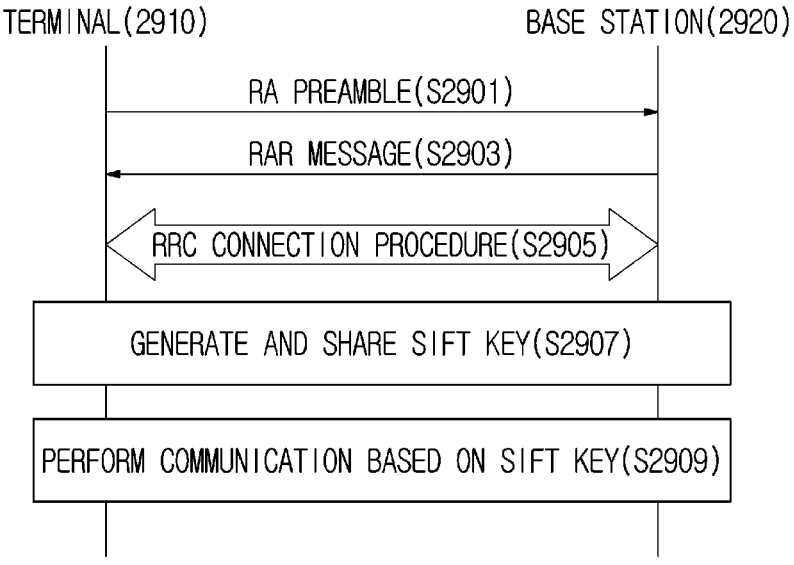
FIG. 29 illustrates an example of a procedure for performing communication in a communication system according to an embodiment of the present disclosure.

FIG. 29 illustrates an example of a procedure for performing communication in a communication system according to an embodiment of the present disclosure. FIG. 29 illustrates signal exchange between a terminal 2910 and a base station 2920.

Referring to FIG. 29, in step S2901, the terminal 2910 transmits a random access (RA) preamble to the base station 2920. The RA preamble is transmitted through a RACH configured by the base station 2920, and information on the RACH (e.g., resource location, etc.) may be obtained from system information broadcast by the base station 2920.

In step S2903, the base station 2920 transmits a random access response (RAR) message to the terminal 2910. That is, the terminal 2910 may receive the RAR from the base station 2920 as a response to the RA preamble.

In step S2905, the terminal 2910 and the base station 2920 perform an RRC connection procedure. To this end, at least one message related to RRC connection establishment may be transmitted and received between the terminal 2910 and the base station 2920. Through this, an RRC layer connection between the terminal 2910 and the base station 2920 may be established.

In step S2907, the terminal 2910 and the base station 2920 generate and share a sift key. For example, the terminal 2910 and the base station 2920 may generate a sift key based on a bi-directional quantum key distribution technique. In this case, the terminal 2910 and the base station 2920 may operate as Alice and Bob. At this time, according to various embodiments, a device operating as Bob among the terminal 2910 and the base station 2920 may transmit an assistance bit in a forward direction, and a device operating as Alice may perform an operation corresponding to the assistance bit. For example, at least one of the terminal 2910 and the base station 2920 may perform one of the procedures of FIGS. 19, 20, 23, 24, 27, and 28.

In step S2909, the terminal 2910 and the base station 2920 perform communication based on the sift key. The sift key generated in step S2907 may be used in various ways. According to various embodiments, the sift key may be used as at least one of an encryption key for data, a seed value used to process data or a signal, or a value used to determine the seed value.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a $3^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method performed by a first device in a communication system, the method comprising:
transmitting or receiving a random access (RA) preamble to or from a second device;

receiving or transmitting a random access response (RAR) message from or to the second device as a response to the RA preamble;
performing a radio resource control (RRC) connection procedure with the second device;
generating a key for communication with the second device; and
performing communication through a radio channel with the second device using the key,
wherein the key is generated by
receiving, through a quantum channel, at least one forward pulse including at least one assistance bit,
transmitting, through the quantum channel, reverse pulses including at least one bit for generating the key, based on the at least one assistance bit included in the forward pulse, and
determining the key based on the reverse pulses.

2. The method of claim 1, wherein the at least one assistance bit represents public information including unencrypted additional information.

3. The method of claim 2, wherein the at least one forward pulse comprises at least one laser pulse including a plurality of photons.

4. The method of claim 2, wherein the generating the key comprises obtaining the public information by decoding the at least one forward pulse.

5. The method of claim 4, wherein the obtaining the public information comprises decoding the at least one forward pulse based on a pattern of transmission bases pre-shared for the public information.

6. The method of claim 4, wherein the generating the key comprises:
obtaining at least one reference pulse by restoring the at least one forward pulse to a reference state based on the public information; and
encoding at least one bit for generating the key in the at least one reference pulse.

7. The method of claim 1, wherein the at least one assistance bit comprises an initial bit for bit-flip encoding.

8. The method of claim 7, wherein the at least one forward pulse comprises at least one laser pulse including a single photon.

9. The method of claim 7, wherein the generating the key comprises generating the reverse pulses by performing the bit-flip encoding based on the initial bit.

10. The method of claim 9, wherein the bit-flip encoding is performed based on one transmission basis during time-bin encoding or phase encoding.

11. A first device in a communication system, the first device comprising:
a transceiver; and
a processor coupled to the transceiver and configured to:
transmit or receive a random access (RA) preamble to or from a second device;
receive or transmit a random access response (RAR) message from or to the second device as a response to the RA preamble;
perform a radio resource control (RRC) connection procedure with the second device;
generate a key for communication with the second device; and
perform communication through a radio channel with the second device using the key,
wherein the key is generated by receiving, through a quantum channel, at least one forward pulse including at least assistance bit, transmitting, through a quantum channel, reverse pulses including at least one bit for generating the key based on the at least one assistance bit included in the forward pulse, and determining the key based on the reverse pulses.

12. The first device of claim 11, wherein the at least one assistance bit represents public information including unencrypted additional information.

13. The first device of claim 12, wherein the at least one forward pulse comprises at least one laser pulse including a plurality of photons.

14. The first device of claim 12, wherein the generating the key comprises obtaining the public information by decoding the at least one forward pulse.

15. The first device of claim 14, wherein the obtaining the public information comprises decoding the at least one forward pulse based on a pattern of transmission bases pre-shared for the public information.

16. The first device of claim 14, wherein the generating the key comprises:

obtaining at least one reference pulse by restoring the at least one forward pulse to a reference state based on the public information; and encoding at least one bit for generating the key in the at least one reference pulse.

17. The first device of claim 11, wherein the at least one assistance bit comprises an initial bit for bit-flip encoding.

18. The first device of claim 17, wherein the at least one forward pulse comprises at least one laser pulse including a single photon.

19. The first device of claim 17, wherein the generating the key comprises generating the reverse pulses by performing the bit-flip encoding based on the initial bit.

20. A second device in a communication system, the second device comprising:

a transceiver; and a processor coupled to the transceiver and configured to:

receive or transmit a random access (RA) preamble from or to a first device;

transmit or receive a random access response (RAR) message to or from the first device as a response to the RA preamble;

perform a radio resource control (RRC) connection procedure with the first device;

generate a key for communication with the first device; and perform communication through a radio channel with the first device using the key, wherein the key is generated by transmitting, through a quantum channel, at least one forward pulse including at least assistance bit, receiving, through the quantum channel, reverse pulses generated based on the at least one assistance bit and including at least one bit for generating the key, and determining the key based on the reverse pulses.

* * * * *